United States Patent
Yerramalli et al.

(10) Patent No.: US 10,721,774 B2
(45) Date of Patent: Jul. 21, 2020

(54) FREQUENCY HOPPING CONFIGURATION FOR A MULTI-TONE PHYSICAL RANDOM ACCESS CHANNEL TRANSMISSION

(71) Applicant: QUALCOMM Incorporated, San Diego, CA (US)

(72) Inventors: Srinivas Yerramalli, San Diego, CA (US); Chih-Hao Liu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 15/811,125

(22) Filed: Nov. 13, 2017

(65) Prior Publication Data

US 2018/0310341 A1    Oct. 25, 2018

Related U.S. Application Data

(60) Provisional application No. 62/489,354, filed on Apr. 24, 2017.

(51) Int. Cl.
*H04J 3/00* (2006.01)
*H04W 74/08* (2009.01)
(Continued)

(52) U.S. Cl.
CPC ........ *H04W 74/0833* (2013.01); *H04B 1/713* (2013.01); *H04B 1/7156* (2013.01);
(Continued)

(58) Field of Classification Search
CPC ............................................. H04W 74/0833
See application file for complete search history.

(56) References Cited

U.S. PATENT DOCUMENTS

| 8,687,657 B2 * | 4/2014 | Ishii .................. H04B 1/713 370/503 |
| 2004/0240525 A1 | 12/2004 | Karabinis et al. |

(Continued)

FOREIGN PATENT DOCUMENTS

| WO | 2017031725 A1 | 3/2017 |
| WO | 2017167309 A1 | 10/2017 |

OTHER PUBLICATIONS

International Search Report and Written Opinion—PCT/US2018/024121—ISA/EPO—dated Jun. 28, 2018.
(Continued)

*Primary Examiner* — Guang W Li
(74) *Attorney, Agent, or Firm* — Steven R. Thiel; Arent Fox LLP

(57) ABSTRACT

In an aspect of the disclosure, a method, a computer-readable medium, and an apparatus are provided. In one configuration, the apparatus may receive, from a base station, first information associated with one or more resources allocated for at least one PRACH transmission. In one aspect, the one or more resources may be allocated in an unlicensed spectrum. In another aspect, the one or more resources may be allocated based on a multi-tone PRACH bandwidth. The apparatus may also receive second information associated with a frequency hopping configuration from the base station. In one aspect, the frequency hopping configuration may be associated with at least one of the one or more allocated resources or the multi-tone PRACH bandwidth. The apparatus may transmit, to the base station, the at least one PRACH transmission using the one or more allocated resources within the multi-tone PRACH bandwidth and the frequency hopping configuration.

30 Claims, 23 Drawing Sheets

(51) Int. Cl.
  *H04B 1/7156* (2011.01)
  *H04W 74/00* (2009.01)
  *H04L 5/00* (2006.01)
  *H04B 1/713* (2011.01)
  *H04W 72/04* (2009.01)
  *H04L 27/26* (2006.01)

(52) U.S. Cl.
  CPC .......... *H04L 5/0012* (2013.01); *H04L 5/0053* (2013.01); *H04W 74/004* (2013.01); *H04W 74/006* (2013.01); *H04L 27/2601* (2013.01); *H04W 72/0453* (2013.01)

(56) References Cited

U.S. PATENT DOCUMENTS

| | | | | |
|---|---|---|---|---|
| 2008/0025257 | A1* | 1/2008 | Laroia | H04L 1/007 370/329 |
| 2009/0279587 | A1* | 11/2009 | Eriksson | H04B 1/7143 375/133 |
| 2016/0323011 | A1* | 11/2016 | Tang | H04B 1/713 |
| 2017/0126274 | A1* | 5/2017 | Kang | H04W 4/70 |
| 2017/0223743 | A1* | 8/2017 | Lin | H04L 5/0012 |
| 2017/0303303 | A1* | 10/2017 | Yang | H04L 5/0048 |
| 2018/0077696 | A1* | 3/2018 | Lee | H04W 74/0833 |
| 2018/0124836 | A1* | 5/2018 | Hong | H04W 74/006 |
| 2018/0255586 | A1* | 9/2018 | Einhaus | H04L 5/00 |
| 2019/0044782 | A1* | 2/2019 | Zeng | H04L 5/0044 |

OTHER PUBLICATIONS

Mediatek Inc: "Considerations on eLAA PRACH Design", 3GPP Draft; R1-165119—PRACH_FINAL, 3rd Generation Partnership Project (3GPP), Mobile Competence Centre, 650, Route Des Lucioles, F-06921, Sophia-Anti Polis Cedex, France, vol. RAN WG1, No. Nanjing, China; May 23, 2016-May 27, 2016 May 14, 2016 (May 14, 2016), XP051089842, Retrieved from the Internet: URL:http://www.3gpp.org/ftp/tsg_ran/WG1_RL1/TSGR1_85/Docs/ [retrieved on May 14, 2016], 9 pages.

Qualcomm Incorporated., "Random access design", 3GPP Draft, R1-157497, Random Access Design, 3rd Generation Partnership Project (3gpp), Mobile Competence Centre, 650, Route Des Lucioles, F-06921, Sophia-Anti Polis Cedex, France, vol. RAN WG1, no. Anaheim, USA, Nov. 15, 2015-Nov. 22, 2015, Nov. 16, 2015 (Nov. 16, 2015), XP051003611, 3 pages. Retrieved from the Internet: URL:http:ffwww.3gpp.org/ftp/Meetings_3GPP_SYNC/RANI/Docs/.

* cited by examiner

FREQUENCY HOPPING CONFIGURATION FOR A MULTI-TONE PHYSICAL RANDOM ACCESS CHANNEL TRANSMISSION

CROSS-REFERENCE TO RELATED APPLICATION(S)

This application claims the benefit of U.S. Provisional Application Ser. No. 62/489,354, entitled "FREQUENCY HOPPING CONFIGURATION FOR A MULTI-TONE PHYSICAL RANDOM ACCESS CHANNEL TRANSMISSION" and filed on Apr. 24, 2017, which is expressly incorporated by reference herein in its entirety.

BACKGROUND

Field

The present disclosure relates generally to communication systems, and more particularly, to a frequency hopping configuration for a multi-tone physical random access channel (PRACH) transmission.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Narrowband communications involve communicating with a limited frequency bandwidth as compared to the frequency bandwidth used for LTE communications. One example of narrowband communication is narrowband (NB) IoT (NB-IoT) communication, which may be limited to a single resource block (RB) of system bandwidth, e.g., 180 kHz. Another example of narrowband communication is enhanced machine-type communication (eMTC), which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

In certain eMTC configurations, the channel bandwidth for the PRACH may be six RBs with various repetition levels to support low complexity devices and high efficiency power amplifier(s) (PA). In certain NB-IoT configurations, the channel bandwidth for the PRACH may be restricted to a single tone (e.g., a single subcarrier, e.g., 15 kHz or 3.75 kHz) to support low complexity devices and high efficiency PA.

However, supporting a six RB based PRACH bandwidth and/or a single tone-based PRACH bandwidth may not be possible due to certain power spectral density (PSD) restrictions and bandwidth requirements for narrowband communications (e.g., eMTC and/or NB-IoT) that use the unlicensed frequency spectrum (e.g., 5 GHz unlicensed frequency spectrum).

Thus, there is a need to provide a PRACH bandwidth and/or a frequency hopping configuration that overcomes the PSD and bandwidth restrictions for narrowband communications using the unlicensed frequency spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband communications involve communicating with a limited frequency bandwidth as compared to the frequency bandwidth used for LTE communications. One example of narrowband communication is NB-IoT communication, which may be limited to a single RB of system bandwidth, e.g., 180 kHz. Another example of narrowband communication is eMTC, which may be limited to six RBs of system bandwidth. NB-IoT communication and/or eMTC may reduce device complexity, enable multi-year battery life, and provide deeper coverage to reach challenging locations such as deep inside buildings.

In certain eMTC configurations, the channel bandwidth for the PRACH may be six RBs with various repetition levels to support low complexity devices and high efficiency PA. In certain NB-IoT configurations, the channel bandwidth for the PRACH may be restricted to a single tone to support low complexity devices and high efficiency PA.

However, supporting a six RB (e.g., 1.08 MHz) based PRACH bandwidth and/or a single tone (e.g., 3.75 kHz, etc.) based PRACH bandwidth may not be possible due to certain PSD restrictions (e.g., transmission power restrictions) and bandwidth requirements for narrowband communications (e.g., eMTC and/or NB-IoT) that use the unlicensed frequency spectrum (e.g., 5 GHz unlicensed frequency spectrum, the sub-2.4 GHz unlicensed frequency spectrum, or the sub-GHz unlicensed frequency spectrum, etc.). In certain countries, the PSD and bandwidth requirements for narrowband communications that use the unlicensed spectrum might be incompatible with a single tone PRACH, for example.

Thus, there is a need to provide a PRACH bandwidth and/or a frequency hopping configuration that overcomes the PSD and bandwidth restrictions for narrowband communications using the unlicensed frequency spectrum.

The present disclosure provides a solution using various frequency hopping configurations for a multi-tone PRACH (e.g., narrowband PRACH (NPRACH)) transmission. For example, a base station of the present disclosure may configure several PRACH resources corresponding to different PRACH bandwidths (e.g., 15 kHz, 45 kHz, 60, kHz, 180 kHz, etc.) that are each associated with a particular transmission power (e.g., 15 dBm, 19.7 dBm, 21 dBm, 25.78 dBm, etc.). In addition, different frequency hopping configurations may be configured such that PRACH transmissions may be sent from a user equipment (UE) using one or more of first-level frequency hopping, second-level frequency hopping, and/or third-level frequency hopping in order to improve time delay estimation and frequency offset estimation accuracy at the base station.

By providing different PRACH bandwidths (e.g., 15 kHz, 45 kHz, 60, kHz, 180 kHz, etc.) that are each associated with a particular transmission power (e.g., 15 dBm, 19.7 dBm, 21 dBm, 25.78 dBm, etc.), the present disclosure may overcome the PSD and bandwidth restrictions for narrowband communications using the unlicensed frequency spectrum in certain countries.

First-level frequency hopping may refer to PRACH transmissions that are sent in symbol groups located in adjacent tones. Second-level frequency hopping may refer to PRACH transmissions that are sent in a second set of adjacent tones, which are non-adjacent to a first set of adjacent tones. Third-level frequency hopping may refer to PRACH transmissions that are sent in a third set of adjacent tones, which are located in a second portion of the unlicensed spectrum that is non-overlapping with the first portion of the unlicensed spectrum (e.g., the portion of the unlicensed spectrum that includes the first set of adjacent tones and the second set of adjacent tones).

By providing different frequency hopping configurations for PRACH transmissions, the present disclosure may be able to improve time delay estimation and frequency offset estimation accuracy at the base station.

In an aspect of the disclosure, a method, a computer-readable medium, and an apparatus are provided. In one configuration, the apparatus may receive, from a base station, first information associated with one or more resources allocated for at least one PRACH transmission. In one aspect, the one or more resources may be allocated in an unlicensed spectrum. In another aspect, the one or more resources may be allocated based on a multi-tone PRACH bandwidth. The apparatus may also receive second information associated with a frequency hopping configuration from the base station. The second information may indicate an anchor channel and one or more frequency hopping channels. In one aspect, the frequency hopping configuration may be associated with at least one of the one or more allocated resources or the multi-tone PRACH bandwidth. The apparatus may transmit, to the base station, the at least one PRACH transmission using the one or more allocated resources within the multi-tone PRACH bandwidth and the frequency hopping configuration.

In another configuration, the apparatus may transmit, to a UE, first information associated with one or more resources allocated to the UE for at least one PRACH transmission. In one aspect, the one or more resources may be allocated in an unlicensed spectrum. In another aspect, the one or more resources may be allocated based on a multi-tone PRACH bandwidth. The apparatus may transmit second information associated with a frequency hopping configuration to the UE. In one aspect, the frequency hopping configuration may be associated with at least one of the one or more allocated resources or the multi-tone PRACH bandwidth. The apparatus may receive, from the UE, the at least one PRACH transmission using the one or more allocated resources within the multi-tone PRACH bandwidth and the frequency hopping configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
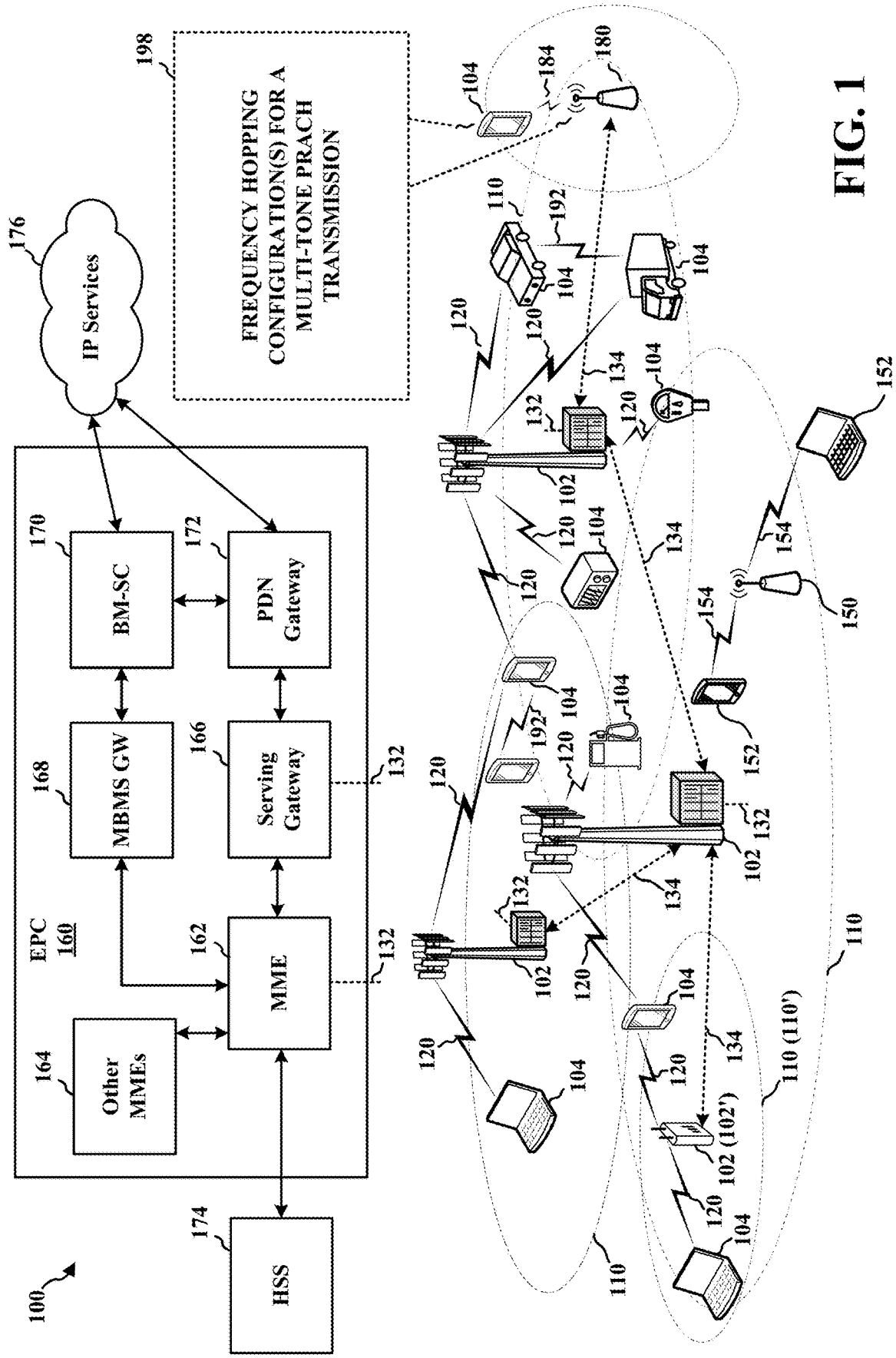
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or base station 180 may be configured to support different PRACH bandwidths (e.g., 15 kHz, 45 kHz, 60, kHz, 180 kHz, etc.) that are each associated with a particular transmission power (e.g., 15 dBm, 19.7 dBm, 21 dBm, 25.78 dBm, etc.), and/or different frequency hopping configurations for PRACH transmissions (198), as described below in connection with any of FIGS. 2A-13.

Figure 2A:
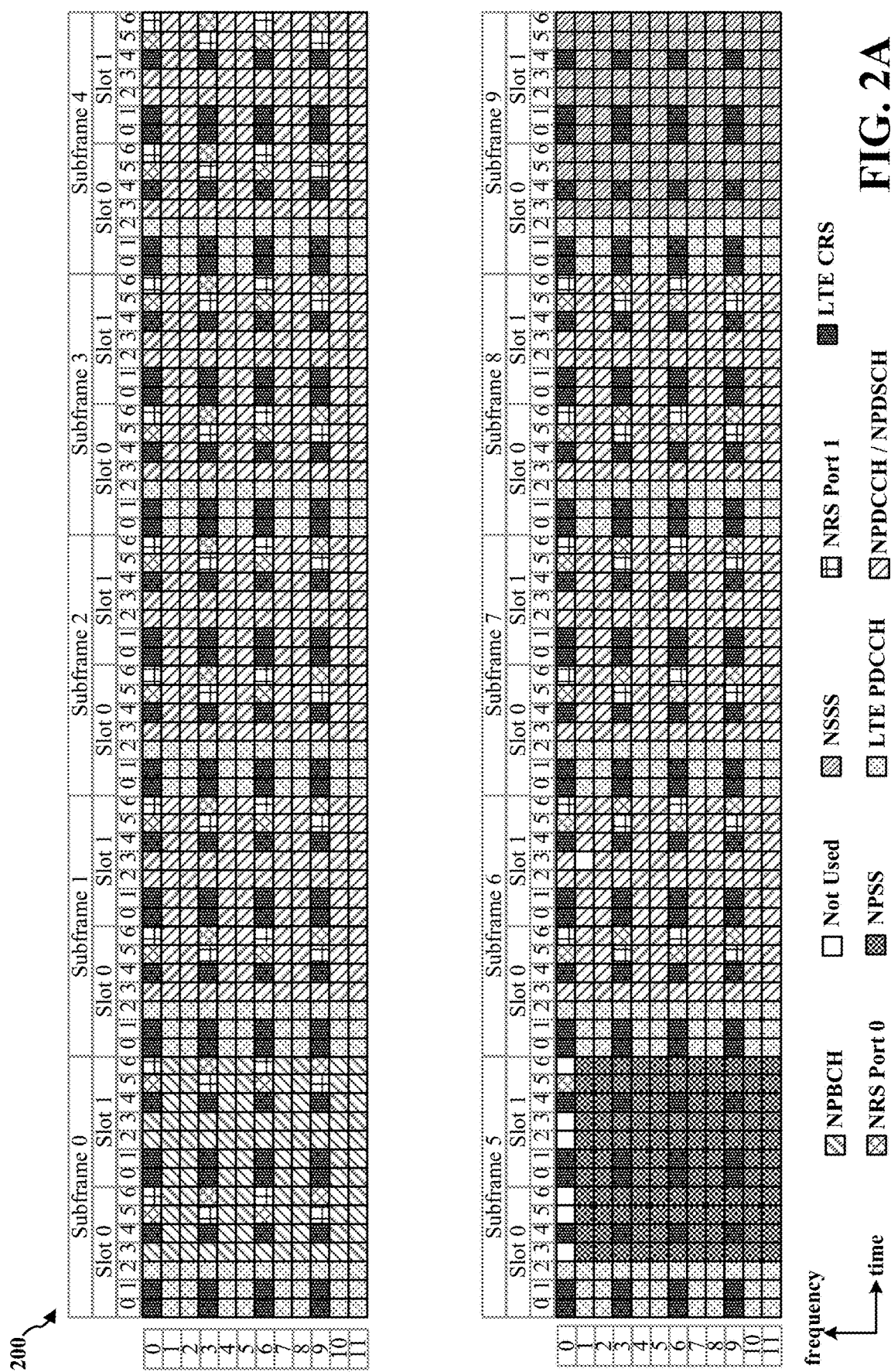
FIGS. 2A, 2B, 2C, and 2D are diagrams illustrating examples of an NB frame structure for in-band deployment inside an LTE carrier (even radio frame), an NB frame structure for in-band deployment inside an LTE carrier (odd radio frame), an NB frame structure for guard band/standalone deployment inside an LTE carrier (even radio frame), and an NB frame structure for guard band/standalone deployment inside an LTE carrier (even radio frame), respectively.
Figure 2B:
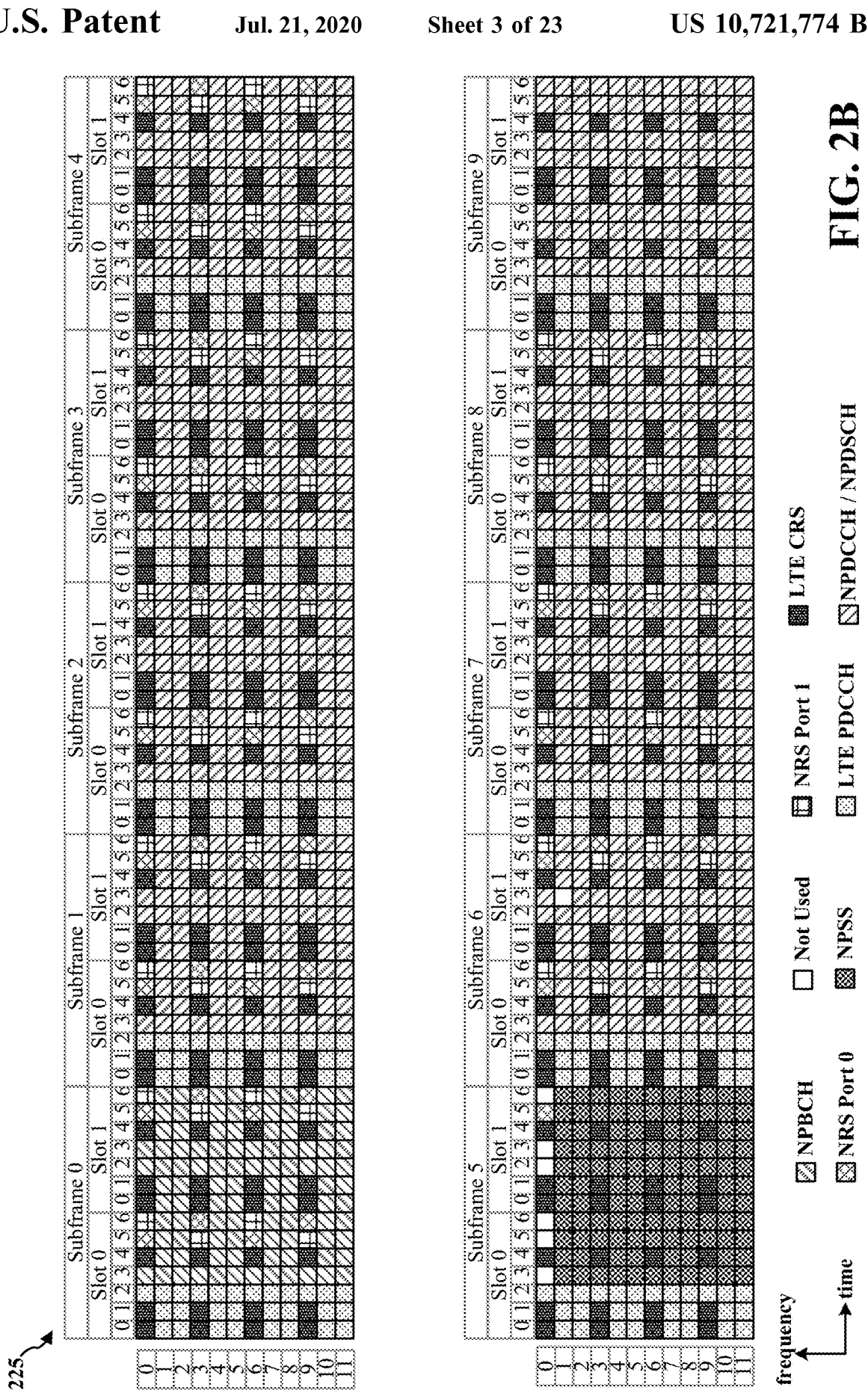
Figure 2C:
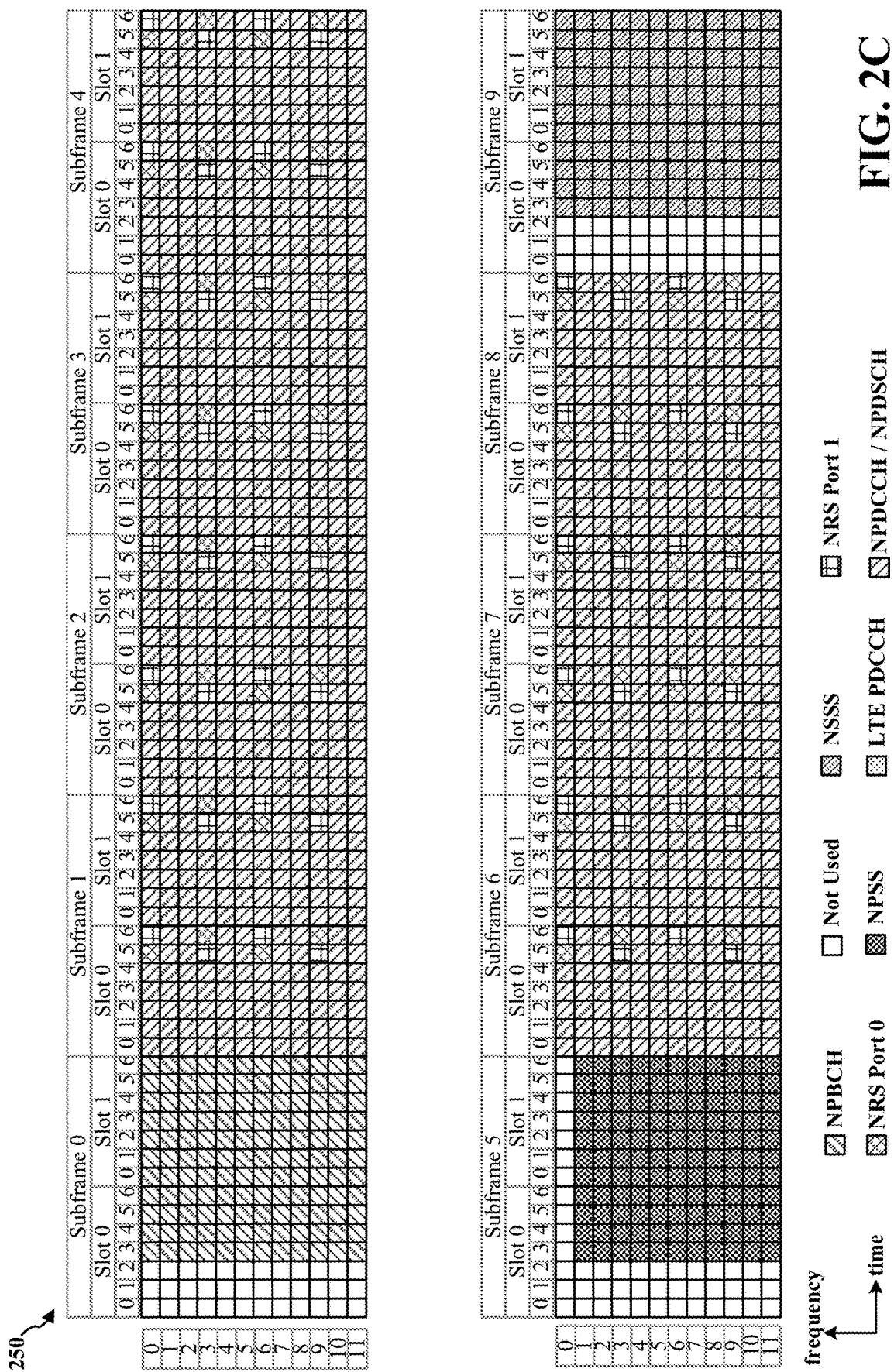
Figure 2D:
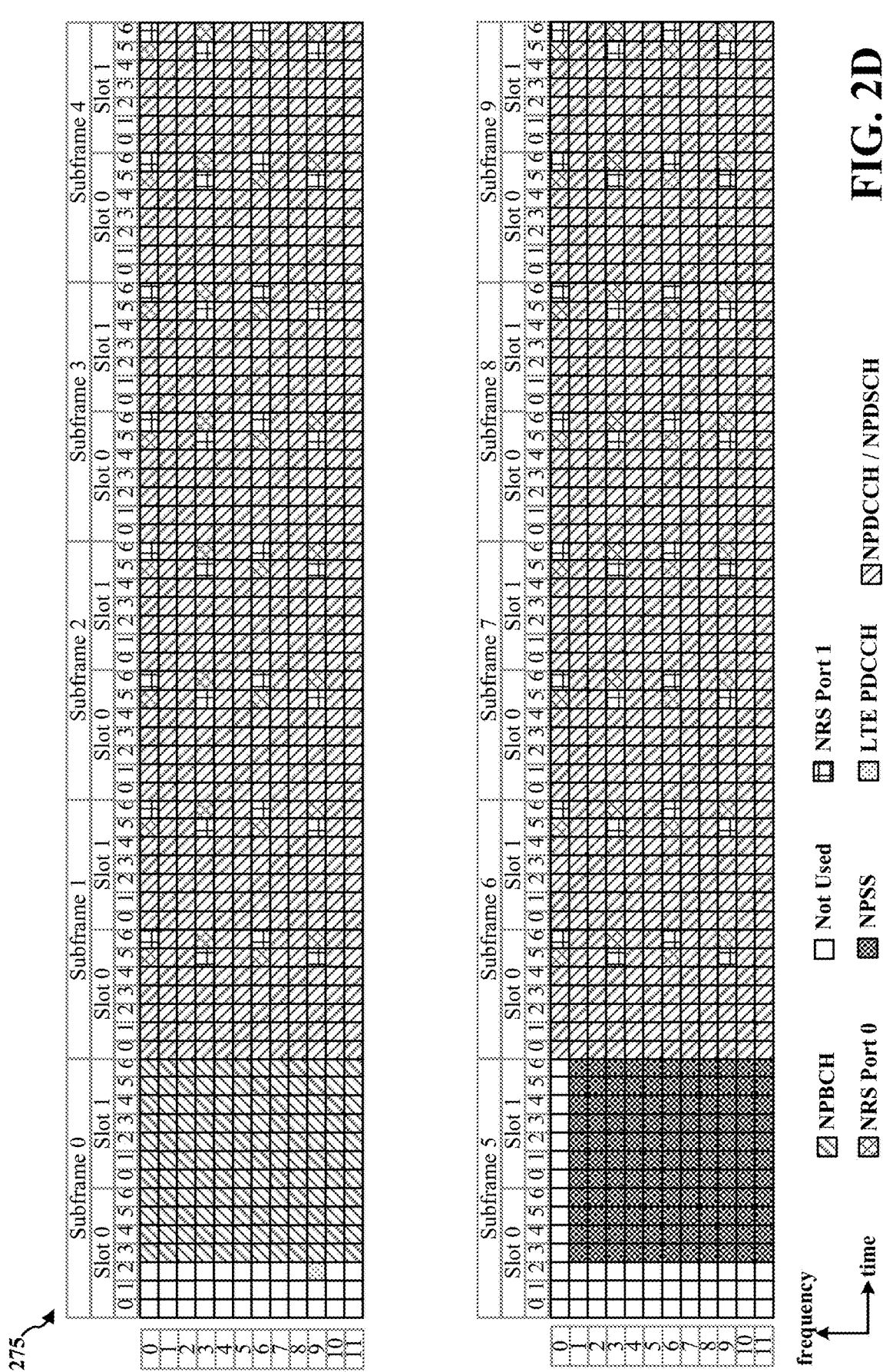

FIG. 2A is a diagram 200 illustrating an example of an NB frame structure for in-band deployment inside an LTE carrier (even radio frame). FIG. 2B is a diagram 225 illustrating an example of an NB frame structure for in-band deployment inside an LTE carrier (odd radio frame). FIG. 2C is a diagram 250 illustrating an example of an NB frame structure for guard band/standalone deployment inside an LTE carrier (even radio frame). FIG. 2D is a diagram 275 illustrating an example of an NB frame structure for guard band/standalone deployment inside an LTE carrier (even radio frame). Other wireless communication technologies may have a different frame structure and/or different channels. A radio frame (10 ms) may be divided into 10 equally sized subframes (e.g., subframe 0-subframe 9). Each subframe may include two consecutive time slots (e.g., slot 0 and slot 1). A resource grid may be used to represent the two time slots, each time slot including one or more time concurrent RBs (also referred to as physical RBs (PRBs)) of 180 kHz. The resource grid is divided into multiple resource elements (REs). For a normal cyclic prefix, an RB may contain 12 consecutive subcarriers in the frequency domain and 7 consecutive symbols (for DL, orthogonal frequency-division multiplexing (OFDM) symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. The in-band deployment of NB-IoT may utilize RBs within an LTE carrier. The guard band deployment of NB-IoT may utilize the unused RBs within an LTE carrier's guard-band. The stand-alone deployment of NB-IoT may utilize RBs within the global system for mobile communications (GSM) carriers.

As illustrated in FIGS. 2A-2D, some of the REs in each of the subframes carry NB reference signals (NRS) that may be used for broadcast transmission(s) or dedicated DL transmission(s), regardless of whether data is actually transmitted. Depending on the transmission scheme, NRS may be transmitted on one antenna port or on two antenna ports (e.g., antenna port 0 and antenna port 1). The values of the NRS may be similar to cell-specific reference signals (CRS) in LTE. NRS may indicate an NB cell identifier (NCellID), while LTE CRS may indicate a physical cell identifier (PCI). For the in-band deployment, the LTE CRS may also be transmitted in subframes which are not used for MBSFN, as illustrated in FIGS. 2A and 2B. Although the structure of the NRS and the LTE CRS may not overlap, the CRS may be taken into account for rate matching and RE mapping purposes. DL transmissions may not use the REs allocated for NRS and/or LTE CRS.

For initial synchronization and in order to determine the NCellID, an NB primary synchronization signal (NPSS) may be transmitted in subframe 5 of even and odd radio frames, and an NB secondary synchronization signal (NSSS) may be transmitted in subframe 9 in even radio frames. Using in-band deployment, the first three OFDM symbols in each of subframe 5 and subframe 9 may carry the LTE physical downlink control channel (PDCCH), and hence, the first three OFDM symbols in subframes 5 and 9 may not carry NPSS and NSSS, as illustrated in FIGS. 2A and 2B. NPSS and the NSSS may be punctured by LTE CRS in the in-band deployment. Using the guard band deployment and/or standalone deployment, the first three OFDM symbols in each of subframe 5 and subframe 9 may be unused, and hence, the first three OFDM symbols in subframes 5 and 9 may not carry the NPSS and NSSS, as illustrated in FIGS. 2C and 2D.

The NB physical broadcast channel (NPBCH) may carry the NB master information block (NB-MIB). After physical layer baseband processing, the resulting NB-MIB may be split into eight blocks. The first block may be transmitted in subframe 0 of each radio frame in a set of eight consecutive radio frames. The second block may be transmitted in subframe 0 of each radio frame in the subsequent set of eight consecutive radio frames. The process of NB-MIB block transmission may be continued until the entire NB-MIB is transmitted. By using subframe 0 for all NB-MIB block transmissions, collisions between the NPBCH and a potential LTE MBSFN transmission may be avoided when the in-band deployment of NB-IoT is used. As illustrated in FIGS. 2A and 2B, NPBCH symbols may be mapped around the NRS and the LTE CRS for the in-band deployment. As illustrated in FIGS. 2C and 2D, the NPBCH may occupy all of subframe 0 except for the first three symbols which are left unused for the guard band deployment and/or standalone deployment.

The principle of a control channel and a shared channel also applies to NB-IoT, defining the NB physical downlink control channel (NPDCCH) and the NB physical downlink shared channel (NPDSCH). Not all subframes may be used for the transmission of dedicated DL channels. In RRC signaling, a bitmap indicating the valid subframes for NPDCCH and/or NPDSCH may be signaled to the UE. When a subframe is not indicated as valid, an NPDCCH and/or NPDSCH may be postponed until the next valid subframe. The NPDCCH may indicate which UEs have data located in the NPDSCH, where to find the data, and how often the data is repeated. UL grants that indicate REs allocated to a UE for UL data transmission(s) may also be located in the NPDCCH. The NPDCCH may also carry paging and/or system information updates. NPDCCH symbols and NPDSCH symbols may be mapped around the NRS, and for the in-band deployment of NB-IoT, also around the LTE CRS.

Figure 3:
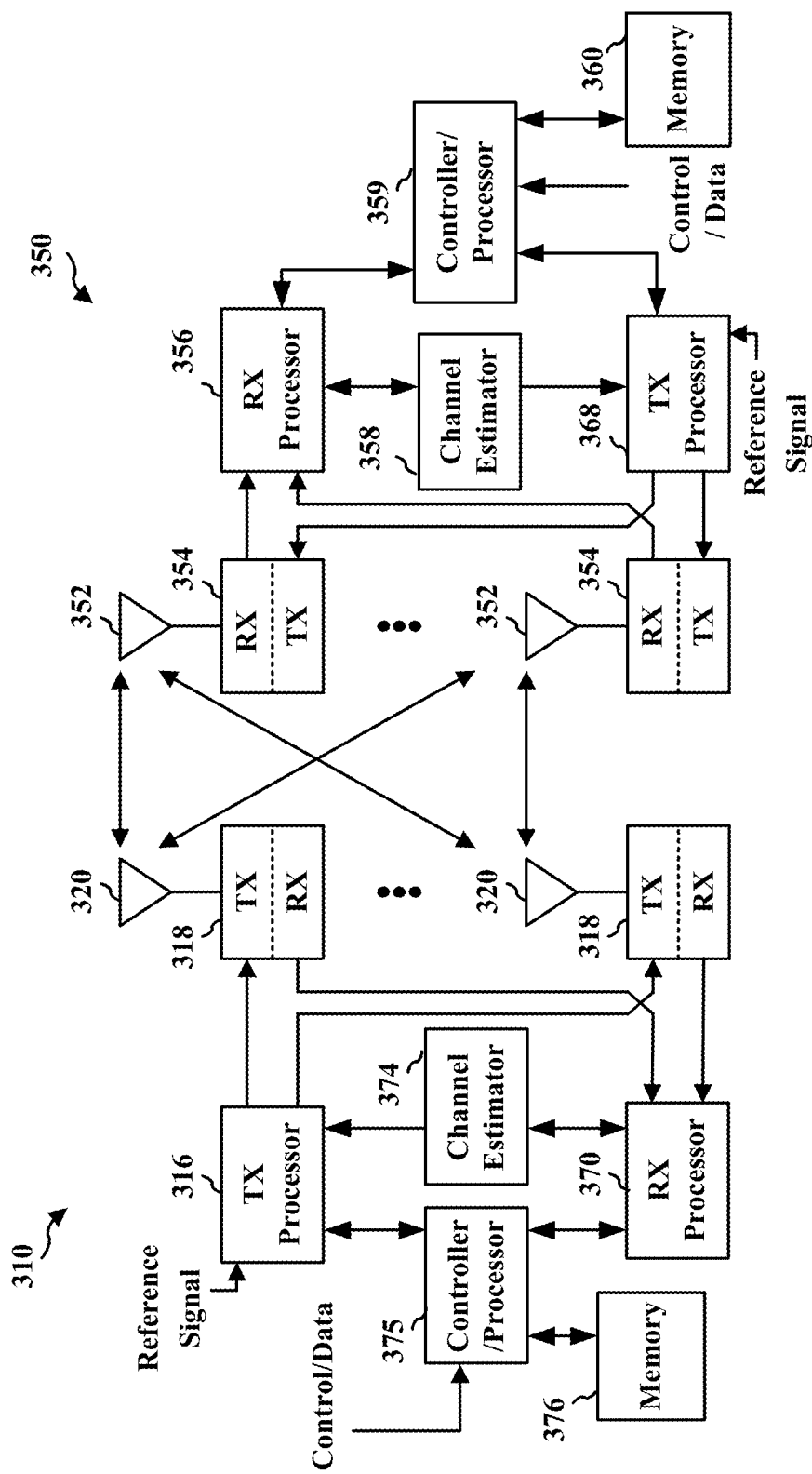
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrowband communications involve communicating with a limited frequency bandwidth as compared to the frequency bandwidth used for LTE communications. One example of narrowband communication is NB-IoT communication, which may be limited to a single RB of system bandwidth, e.g., 180 kHz. Another example of narrowband communication is eMTC, which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

In certain eMTC configurations, the channel bandwidth for the PRACH may be six RBs with various repetition levels to support low complexity devices and high efficiency PA. In certain NB-IoT configurations, the channel bandwidth for the PRACH may be restricted to a single tone to support low complexity devices and high efficiency PA.

However, supporting a six RB (e.g., 1.08 MHz) based PRACH bandwidth and/or a single tone (e.g., 3.75 kHz, etc.) based PRACH bandwidth may not be possible due to certain PSD restrictions (e.g., transmission power restrictions) and bandwidth requirements for narrowband communications (e.g., eMTC and/or NB-IoT) that use the unlicensed frequency spectrum (e.g., 5 GHz unlicensed frequency spectrum, the sub-2.4 GHz unlicensed frequency spectrum, or the sub-GHz unlicensed frequency spectrum, etc.).

For example, the system bandwidth for narrowband communications using the unlicensed spectrum in Japan may be restricted to, e.g., 200 kHz and a five-channel aggregation. Hence, a six RB based PRACH bandwidth may not be supported in Japan because narrowband communications may be restricted to a bandwidth (e.g., 200 kHz) that is smaller than six RBs (e.g., 1.08 MHz).

In another example, the system bandwidth for narrowband communications using the unlicensed spectrum in Korea may be restricted to, e.g., 200 kHz when frequency hopping is used. Hence, a six RB based PRACH bandwidth may not be supported in Korea because narrowband communications may be restricted to a bandwidth (e.g., 200 kHz) that is smaller than six RBs (e.g., 1.08 MHz).

In a further example, the system bandwidth for narrowband communications using the unlicensed spectrum in China may be restricted to, e.g., 1 MHz within a 24 MHz system bandwidth. Hence, a six RB based PRACH bandwidth may not be supported in China because narrowband communications may be restricted to a bandwidth (e.g., 1 MHz) that is smaller than six RBs (e.g., 1.08 MHz).

In an additional example, the PSD used for PRACH transmissions in the United States may be limited to a maximum of 8 dBm/3 kHz. Hence, a UE may not be able to transmit a single tone transmission using full power in the unlicensed spectrum because the maximum PSD is limited to a bandwidth (e.g., 3 kHz) that is smaller than a single tone (e.g., 3.75 kHz). Further, the system bandwidth for narrowband communications using the unlicensed spectrum in the United States may be restricted to, e.g., 500 kHz when frequency hopping is used. Hence, a six RB based PRACH bandwidth may not be supported in the United States because narrowband communications may be restricted to a bandwidth (e.g., 500 kHz) that is smaller than six RBs (e.g., 1.08 MHz).

Thus, there is a need to provide a PRACH bandwidth and/or a frequency hopping configuration that overcomes the PSD and bandwidth restrictions for narrowband communications using the unlicensed frequency spectrum.

Coverage enhancements of narrowband devices (e.g., UEs and/or base stations) may be employed to provide more reliable communications within a narrowband communication system. Coverage enhancements may include, among others, frequency hopping. For example, a UE and/or base station may perform frequency hopping by monitoring, receiving, and/or transmitting signals by switching a carrier among different frequency channels (e.g., narrowband channels) to exploit the frequency diversity of the unlicensed frequency spectrum.

One aspect of coverage enhancements provided by the present disclosure may be a frequency hopping configuration for a multi-tone PRACH (e.g., NPRACH) transmission. For example, a base station of the present disclosure may configure several PRACH resources corresponding to different PRACH bandwidths (e.g., 15 kHz, 45 kHz, 60, kHz, 180 kHz, etc.) that are each associated with a particular transmission power (e.g., 15 dBm, 19.7 dBm, 21 dBm, 25.78 dBm, etc.). In addition, different frequency hopping configurations may be configured such that PRACH transmissions may be sent from a UE using one or more of first-level frequency hopping, second-level frequency hopping, and/or third-level frequency hopping in order to improve time delay estimation and frequency offset estimation accuracy at the base station.

By providing different PRACH bandwidths (e.g., 15 kHz, 45 kHz, 60, kHz, 180 kHz, etc.) that are each associated with a particular transmission power (e.g., 15 dBm, 19.7 dBm, 21 dBm, 25.78 dBm, etc.), the present disclosure may overcome the PSD and bandwidth restrictions for narrowband communications using the unlicensed frequency spectrum discussed above.

First-level frequency hopping may refer to PRACH transmissions that are sent in symbol groups located in adjacent tones. Second-level frequency hopping may refer to PRACH transmissions that are sent in a second set of adjacent tones. The second set of adjacent tones may be non-adjacent to the first set of adjacent tones. Third-level frequency hopping may refer to PRACH transmissions that are sent in a third set of adjacent tones. The third set of adjacent tones may be located in a second portion of the unlicensed spectrum that is non-overlapping with the first portion of the unlicensed spectrum (e.g., that includes the first set of adjacent tones and the second set of adjacent tones).

By providing different frequency hopping configurations for PRACH transmissions, the present disclosure may be able to improve time delay estimation and frequency offset estimation accuracy at the base station.

FIGS. 4A-4D illustrate a data flow 400 between a UE 402 and a base station 404 that may overcome the PSD and/or bandwidth restrictions for narrowband communications using the unlicensed frequency spectrum in accordance with certain aspects of the disclosure. UE 402 may correspond to, e.g., UE 104, 350, 1250, the apparatus 902/902'. Base station 404 may correspond to, e.g., base station 102, 180, 950, eNB 310, apparatus 1202/1202'. In addition, the UE 402 and the base station 404 may be configured to communicate using narrowband communications (e.g., NB-IoT and/or eMTC). In other words, the UE 402 may be an NB-IoT device and/or an eMTC device. In addition, the base station 404 may configure a PRACH bandwidth that is different than a single-tone PRACH bandwidth and/or a six RB PRACH bandwidth. Further, UE 402 may send PRACH transmissions to the base station 404 based on a frequency hopping configuration.

Figure 4A:
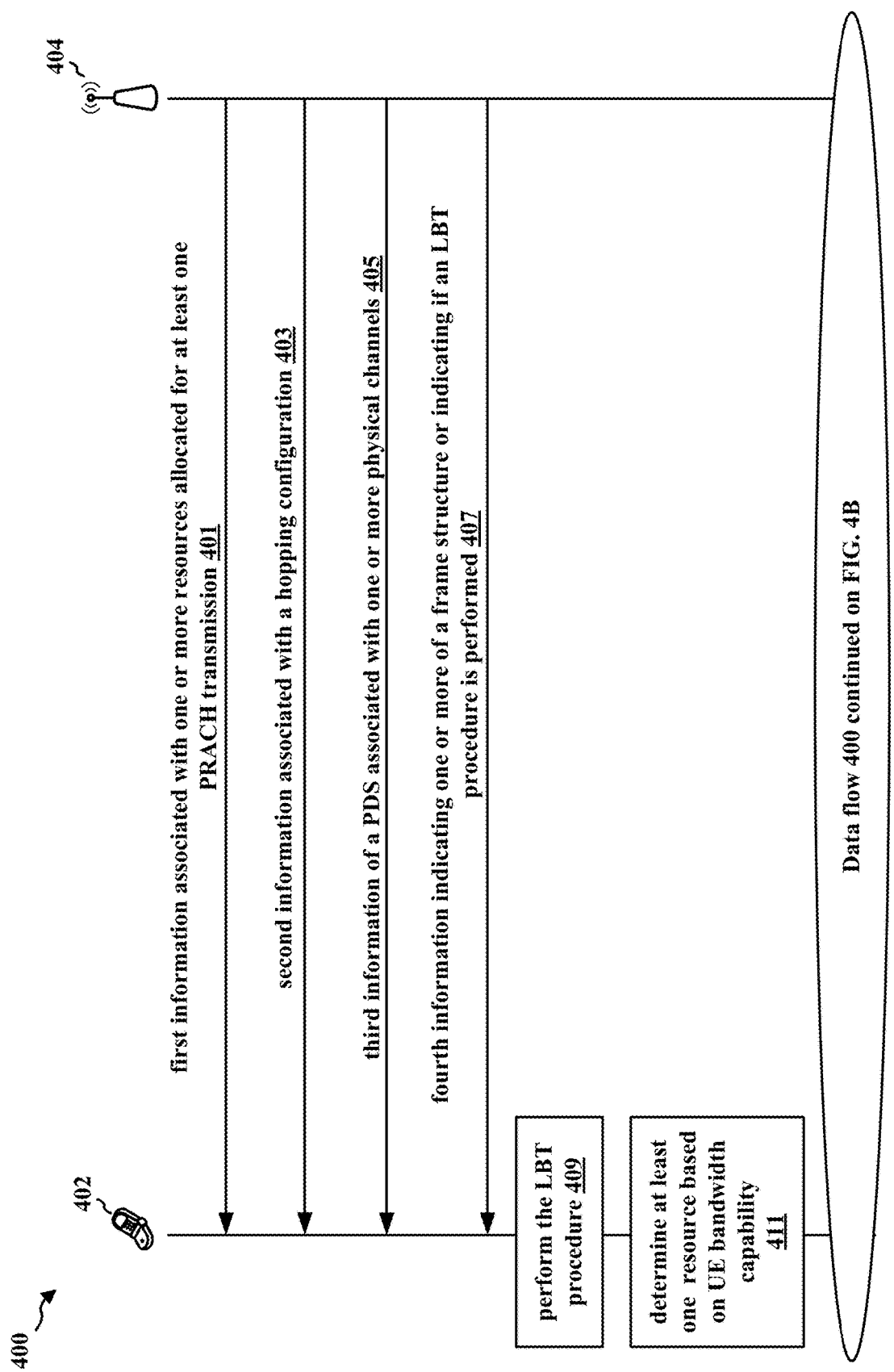
FIGS. 4A-4D illustrate a data flow between a UE and a base station in accordance with certain aspects of the disclosure.

As seen in FIG. 4A, the base station 404 may transmit first information 401 associated with one or more resources allocated for at least one PRACH transmission to the UE 402. In one aspect, the one or more resources may be allocated in the unlicensed spectrum, and the one or more resources may be allocated based on a PRACH bandwidth (e.g., a multi-tone PRACH bandwidth) that is configured by the base station 404. For example, the PRACH bandwidth configured by the base station 404 may include a 15 kHz bandwidth (e.g., four tones each with a 3.75 kHz subcarrier spacing corresponding to 12 possible hops per RB), a 45 kHz bandwidth (e.g., twelve tones each with a 3.75 kHz subcarrier spacing corresponding to 4 possible hops per RB), a 60 kHz bandwidth (e.g., sixteen tones each with a 3.75 kHz subcarrier spacing corresponding to 3 possible hops per RB), or 180 kHz bandwidth (e.g., forty-eight tones each with a 3.75 kHz subcarrier spacing), etc.

In one aspect, the base station 404 may configure the PRACH bandwidth based on a maximum bandwidth supported by the base station 404 and/or a maximum bandwidth supported by the UE 402. In one example, if the maximum bandwidth supported by the base station 404 and/or the UE 402 is 1 RB, then the PRACH bandwidth may be configured as 45 kHz. In another example, if the maximum bandwidth supported by the base station 404 and/or the UE 402 is 5 RBs, then the PRACH bandwidth may be configured as 180 kHz.

In certain configurations, the first information 401 may indicate a number of repetitions associated with PRACH transmissions. For example, the number of repetitions may be four repetitions, eight repetitions, sixteen repetitions, etc. In one aspect, the number of repetitions may be associated with the PRACH bandwidth configured by the base station 404.

As also seen in FIG. 4A, the base station 404 may transmit second information 403 associated with a frequency hopping configuration to the UE 402. In one aspect, the frequency hopping configuration may be selected and/or configured by the base station 404 based on one or more of the resources allocated for PRACH transmissions, the multi-tone PRACH bandwidth, and/or a maximum bandwidth capability of the UE 402. In one aspect, frequency hopping may be an optional feature of the present disclosure. The function of one-tone PRACH hopping in narrowband communications may be provided by configuring a multi-tone PRACH bandwidth, and hence, there may not be a need for frequency hopping when a multi-tone PRACH bandwidth is configured. For example, a two (or three) tone PRACH transmission may effectively address timing delay estimation and/or frequency offset estimation assuming that the PRACH bandwidth of the total transmission is small enough to consider the channel as flat fading.

However, sending PRACH transmissions using frequency hopping may provide the benefit of improving the time delay estimation and improving frequency offset estimation accuracy at the base station 404. For example, the signal model for a PRACH transmission described below may illustrate the benefit of using a frequency hopping configuration for PRACH transmissions in a multi-tone PRACH bandwidth.

In one configuration, the baseband signal for the PRACH transmission at the UE 402 may be described using equation (1) seen below.

$$s[n; m] = \frac{\sqrt{E}}{N} \sum_{\{k \in \mathcal{K}\}} S[k; m] e^{\frac{j2\pi k n}{N}}, n = -N_{cp}, \ldots 0, 1, \ldots, NR - 1 \qquad \text{Equation (1)}$$

With respect to equation (1), s[n; m] may be the time domain signal to be transmitted by the UE 402 for one PRACH transmission in a given symbol group, n may be the subcarrier index within the PRACH bandwidth, m may be the symbol index within the PRACH bandwidth, R may be the number of OFDM symbol repetitions for each transmission before hopping to a new tone, E may be the energy of the transmission, N may be the size of the inverse fast Fourier transform (IFFT)/fast Fourier transform (FFT) for OFDM symbol generation for PRACH, K may be the set of adjacent carriers on which one or more PRACH transmissions is/are mapped, and $N_{cp}$ may be the CP.

For simplicity, assume that the channel gain is constant for all subcarriers (e.g., tones) in the PRACH bandwidth. A constant channel gain for all subcarriers may imply that that the signal may be modeling a flat fading channel with a delay parameter rather than a frequency selective fading channel. Modeling a flat fading channel rather than a frequency selective fading channel may be permitted when the total transmission bandwidth (e.g., PRACH bandwidth) is less than a threshold amount. For example, a PRACH transmission in a 45 kHz PRACH bandwidth may allow the UE 402 to transmit at full power or almost full power in the unlicensed spectrum. In addition, the transmission power on a 45 kHz PRACH bandwidth may be small enough to assume that all tones have the same channel.

The received signal at the base station 404 in the time domain may be expressed as using equation (2) seen below.

$$y[n, m] = h[\mathcal{K}]s[n - D, m]e^{j2\pi\Delta f(n-D+m(N_{cp}+NR))} = \frac{\sqrt{E}}{N}h[\mathcal{K}] \quad \text{Equation (2)}$$

$$\sum_{\{k \in \mathcal{K}\}} S[k; m]e^{j\frac{2\pi k(n-D)}{N}}e^{j2\pi\Delta f(n-D+m(N_{cp}+NR))} + v[k; m]$$

With respect to equation (2) seen above and equation (3) seen below, y[n; m] may be the time-domain signal received by the base station 404 for one PRACH transmission in a given symbol group, v[k; m] may be the noise at subcarrier k/symbol m combination, R may be the number of OFDM symbol repetitions for each transmission before hopping to a new tone, E may be the energy of the transmission, N may be the size of the IFFT/FFT for OFDM symbol generation for PRACH, K may be the set of adjacent carriers on which a PRACH transmission is mapped, $N_{cp}$ may be the CP, D may be the delay due to no uplink synchronization at the UE 402, and Δf may be the residual frequency offset.

By way of example, assume R=1 for simplicity. The base station 404 may then receive the signal, discard the first $N_{cp}$ samples, and performs a FFT to extract the tone(s), as illustrated below in equation (3).

$$Y[l; m] = \sum_{\{n=0\}}^{\{N-1\}} y[n; m]e^{-\frac{j2\pi ln}{N}}, \quad \text{Equation (3)}$$

$$l \in \mathcal{K} = \frac{\sqrt{E}}{N}h[\mathcal{K}]e^{j2\pi\Delta f(m(N_{cp}+N)-D)}$$

$$\sum_{\{k \in \mathcal{K}\}} S[k; m]e^{-\frac{j2\pi kD}{N}}\sum_{\{n=0\}}^{\{N-1\}} e^{\frac{j2\pi(k-l+\Delta f)n}{N}} + \tilde{v}(l; m)$$

For one of the tones (e.g., subcarriers) of interest, assume k=l in equation (4) seen below.

$$Y[l; m] = \frac{\sqrt{E}}{N}h[\mathcal{K}]e^{j2\pi\Delta f(m(N_{cp}+N)+\frac{N-1}{2}-D)} \quad \text{Equation (4)}$$

-continued
$$\frac{\sin(N\pi\Delta f)}{\sin(\pi\Delta f)}S[l; m]e^{\frac{-j2\pi lD}{N}} + \tilde{v}(l; m) + Intf$$

With respect to equation (4), Intf may be the interference from subcarriers k≠l as observed on the subcarrier l, and ṽ(l; m) may be the noise in subcarrier l/symbol m combination. As a first order approximation, assuming that Δf is small, the interference term may be ignored by the base station 404. The summation term may be independent of the subcarrier being observed.

Consequently, since the phase term may be a function of l (e.g., the other terms may not be a function of l as seen above in equation (4), the phase difference between the received and de-rotated adjacent symbols may be used to determine a coarse estimate of the delay D. For example, the phase of the term $Y[l_1; m]S^{\{*\}}[l_1; m]Y^{\{*\}}[l_2; m]S[l_2; m]$ may be proportional to $2\pi(l_1-l_2)D/N$. In one aspect, $(l_1-l_2)$ may be the distance between the tones, if $l_1$ and $l_2$ are close to each other (e.g., adjacent tones) the base station 404 may determine an accurate estimation of timing delay D.

Assuming D may be estimated using the solution described above (e.g., D may be coarsely estimated or finely estimated depending on how many tones are used), and since both h[K] and Δf are unknown at the UE 402, the PRACH transmission may be repeated in time to increase the accuracy of frequency estimation. By comparing the terms $Y[l; m]S^{\{*\}}[l; m]$ and $Y[l; m+1]S^{\{*\}}[l; m+1]$, an estimate of the frequency offset may be determined since both terms have the same channel gain. A more accurate estimate of the frequency offset may be determined by increasing the number of PRACH repetitions in time (e.g., assuming that the channel is constant between m and m+1 symbol groups).

For narrowband communications, the PRACH transmission may be a pure tone, and there may be no additional sequence modulation. However, for unlicensed narrowband communications, a PRACH sequence (e.g., the sequence of a PRACH transmission) of the present disclosure may include advantageous properties even when using small number of tones. Note that for Zadoff-Chu (ZC) sequences, the cross-correlation between sequences may be proportional to $\sqrt{N_{zc}}$.

In certain aspects, frequency hopping configurations may include a multi-level frequency hopping configuration as described below in connection with each of FIGS. 5, 6, and 7.

Still referring to FIG. 4A, the base station 404 may transmit third information 405 associated with a PDS to the UE 402. In one aspect, the third information 405 may indicate the transmission power used for PRACH transmissions based on the PRACH bandwidth. Additionally and/or alternatively, the third information 405 may indicate if a PSD limit is applicable to a physical channel (e.g., PRACH, PUCCH, PUSCH, etc.) and may also indicate the PSD limit. The third information 405 may be transmitted in, e.g., a SIB. The PSD limit may be the maximum transmission power the UE 402 may use to send an uplink transmission to the base station 404 (e.g., using the PRACH, PUCCH, PUSCH, etc.). In one aspect, the transmission power used for an initial PRACH transmission based on the PRACH bandwidth may be less than the PSD limit. If the initial PRACH transmission is not properly received and/or decoded by the base station 404, the UE 402 may increase the transmission power up to but not exceeding the PSD limit for the PRACH.

In a first example, when the multi-tone PRACH bandwidth is 15 kHz, the third information 405 may indicate that the PSD (e.g., transmission power) associated with a PRACH transmission from the UE 402 may be, e.g., 15 dBm. In a second example, when the multi-tone PRACH bandwidth is 45 kHz, the third information 405 may indicate that the PSD (e.g., transmission power) associated with a PRACH transmission from the UE 402 may be, e.g., 19.7 dBm. In a third example, when the multi-tone PRACH bandwidth is 60 kHz, the third information 405 may indicate that the PSD (e.g., transmission power) associated with a PRACH transmission from the UE 402 may be, e.g., 21 dBm. In a fourth example, when the multi-tone PRACH bandwidth is 180 kHz, the third information 405 may indicate that the PSD (e.g., transmission power) associated with a PRACH transmission from the UE 402 may be, e.g., 25.78 dBm.

Alternatively, information associated with the PSD for a PRACH transmission discussed above may be included in first information 401, or in separate signaling (e.g., not illustrated in FIGS. 4A-4D). In another configuration, the UE 402 may be pre-configured with knowledge of each transmission power associated with the various PRACH bandwidths. Thus, when the first information 401 is received indicating the PRACH bandwidth, the UE 402 may determine the associated PSD based on the pre-configured knowledge (e.g., using a look-up table maintained by the UE 402) without the third information 405 being transmitted.

Referring to FIG. 4A, the base station 404 may transmit fourth information 407 that indicates a frame structure associated with the one or more resources allocated for the at least one PRACH transmission. For example, the fourth information 407 may indicate the number of UL subframes, DL subframes, and/or special subframes in each radio frame. In addition, the fourth information 407 may indicate which UL subframes are unavailable for PRACH transmissions by the UE 402.

Additionally and/or alternatively, the fourth information 407 may indicate if a listen-before-talk (LBT) procedure is performed by the UE 402 prior to transmitting one or more PRACH transmissions. In one aspect, the fourth information 407 may indicate how frequently the UE 402 performs the LBT procedure (e.g., before each PRACH transmission, before every other PRACH transmissions, before a first PRACH transmission in each radio frame, etc.).

A LBT procedure may include sensing a channel (e.g., using energy detection) prior to transmission to determine if the channel is idle or if signals from other users are detected on the channel. Based on the fourth information 407, the UE 402 may determine 409 to perform an LBT procedure before transmitting a PRACH transmission. For example, the UE 402 may transmit a PRACH transmission if the channel is idle, and the UE 402 may not transmit a PRACH transmission when signals from other UEs are detected on the channel (e.g., when the channel is not idle). Performing LBT may be beneficial for coexistence with different radio access technologies (RATs) (e.g., Wi-Fi and NB-IoT/eMTC) in the unlicensed spectrum.

Referring to FIG. 4A, the UE 402 may determine 411 one of allocated resources indicated in the first information 401 for transmitting at least one PRACH transmission. In one aspect, the UE 402 may determine 411 which allocated resources to use for a PRACH transmission based on a bandwidth capability of the UE 402. For example, when the first information 401 indicates a number of different resource configurations that may be available to the UE 402, the UE 402 may determine 411 which of the different resource configurations to use for a PRACH transmission based on the bandwidth capability of the UE 402.

In one aspect, the maximum bandwidth that is supported by the UE 402 may be, e.g., 1 RB. In another aspect, the maximum bandwidth that is supported by the UE 402 may be, e.g., 6 RBs. In a further aspect, the maximum bandwidth that may be supported by the UE 402 may be, e.g., more than 6 RBs. When the UE 402 has a maximum bandwidth of 1 RB, the UE 402 may use one or more first allocated resources (e.g., indicated in the first information 401) for a PRACH transmission. When the UE 402 has a maximum supported bandwidth of 6 RBs, the UE 402 may use one or more second allocated resources (e.g., a greater number of resources than the first allocated resources) for a PRACH transmission. When the UE 402 has a maximum supported bandwidth of more than 6 RBs, the UE 402 may use one or more third allocated resources (e.g., a greater number of resources than the first allocated resources and the second allocated resources).

Figure 4B:
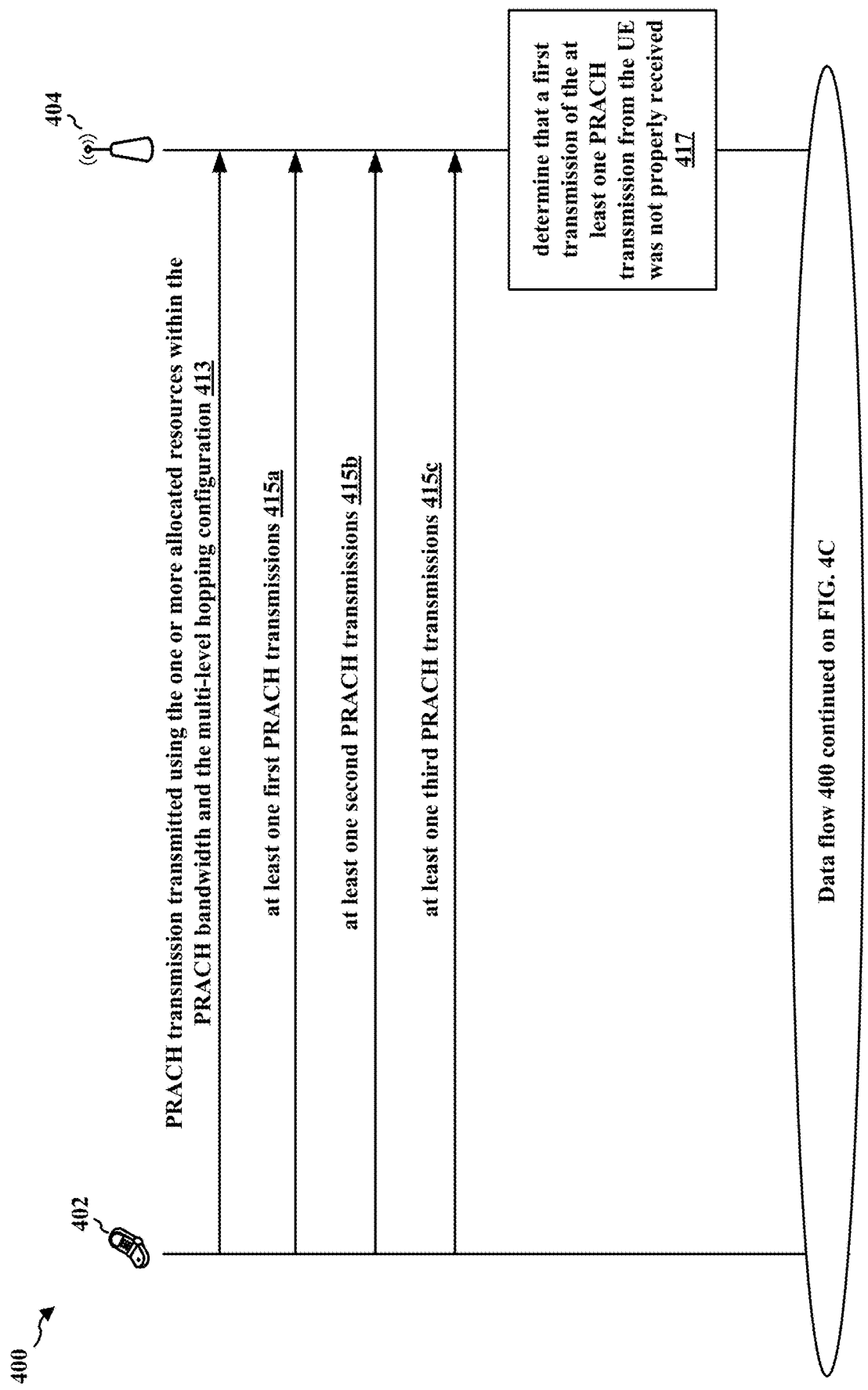

Referring to FIG. 4B, the UE 402 may transmit at least one PRACH transmission 413 using the one or more allocated resources within the configured PRACH bandwidth and using the frequency hopping configuration. In certain aspects, the frequency hopping configuration may include a two-level frequency hopping configuration as described below in connection with FIG. 5 (e.g., first level hopping and second level hopping) and FIG. 7 (e.g., second level hopping and third level hopping). In certain other aspects, the frequency hopping configuration may include a three-level frequency hopping configuration, as described below in connection with FIG. 6 (e.g., first level hopping, second level hopping, and third level hopping).

In a first aspect, the UE 402 may transmit the PRACH transmission 413 by transmitting a first set of PRACH transmissions 415*a* using a first set of symbol groups located in a first set of adjacent tones, as discussed below in connection with FIGS. 5 and 6. Transmitting PRACH transmissions in symbol groups located in adjacent tones may be referred to a first-level frequency hopping (e.g., see 518*a* in FIGS. 5 and 618*a* in FIG. 6). In one aspect, the first set of adjacent tones may be located in a first portion of the unlicensed spectrum.

In a second aspect, the UE 402 may transmit the PRACH transmission 413 by transmitting a second set of PRACH transmissions 415*b* using a second set of symbol groups located in a second set of adjacent tones, as discussed below in connection with FIGS. 5 and 6. In one aspect, the second set of adjacent tones may be non-adjacent to the first set of adjacent tones. PRACH transmissions sent in a second set of adjacent tones that are non-adjacent to the first set of adjacent tones may be referred to a second-level frequency hopping (e.g., see 518*b* in FIG. 5, 618*b* in FIG. 6, and 718*b* in FIG. 7). In addition, the second set of adjacent tones may also be located in the first portion of the unlicensed spectrum (e.g., the portion of the unlicensed spectrum that includes the first set of adjacent tones).

In a third aspect, the UE 402 may transmit the PRACH transmission 413 by transmitting a third set of PRACH transmissions 415*c* using a third set of symbol groups located in a third set of adjacent tones. In one aspect, the third set of adjacent tones may be located in a second portion of the unlicensed spectrum that is non-overlapping with the first portion of the unlicensed spectrum.

For example, the UE 402 may transmit PRACH transmissions in symbol groups located in a different portion of the unlicensed spectrum when the base station 404 performs frequency hopping. For example, the base station 404 may perform frequency hopping by switching a carrier among different frequency channels (e.g., narrowband channels) to exploit the frequency diversity of the unlicensed spectrum. In one aspect, the base station 404 may switch from a first frequency channel in the first portion of the unlicensed spectrum to a second frequency channel in the second portion of the unlicensed spectrum.

Figure 6:
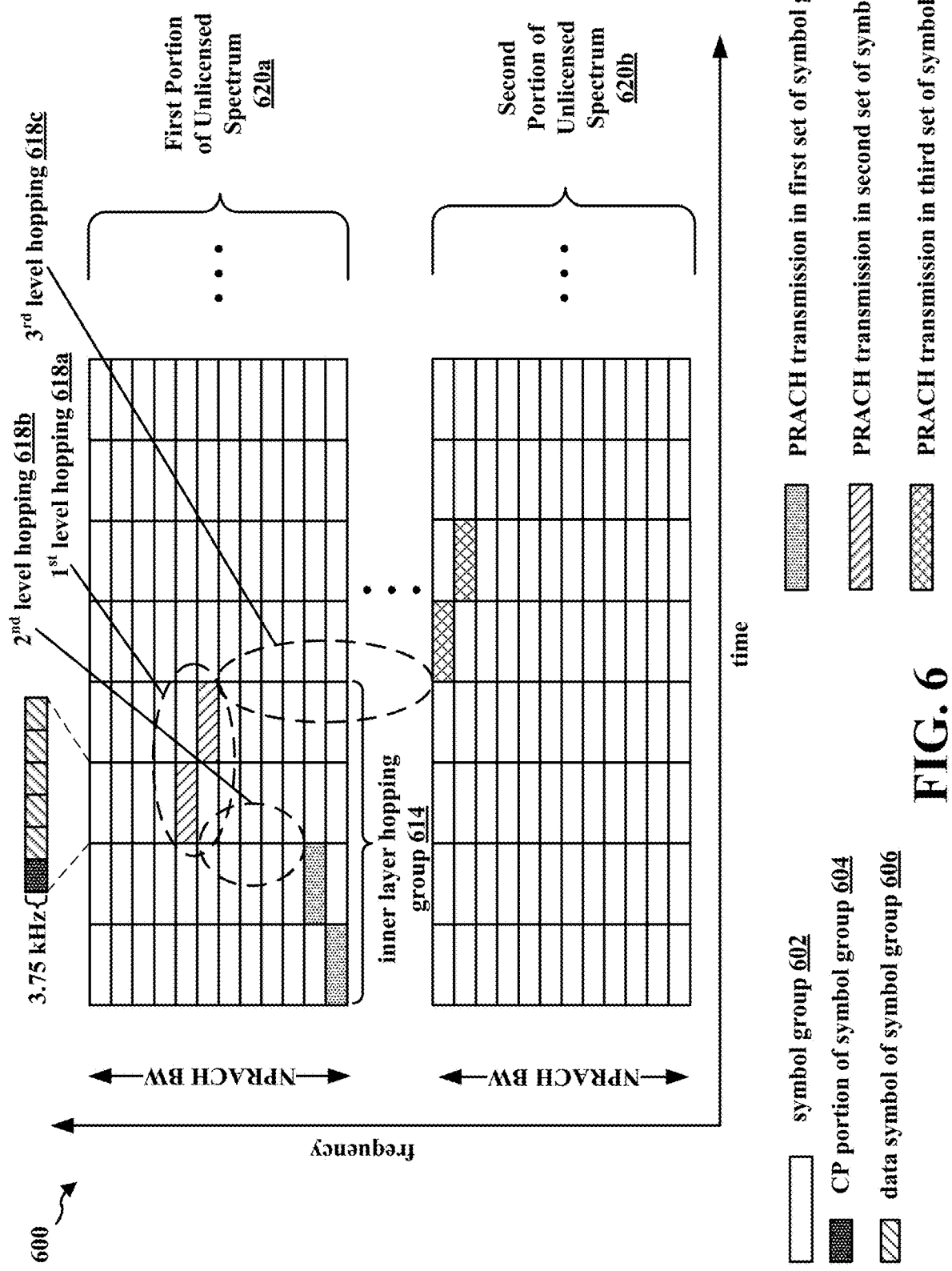
FIG. 6 illustrates an example frequency hopping configuration in accordance with certain aspects of the disclosure.
Figure 7:
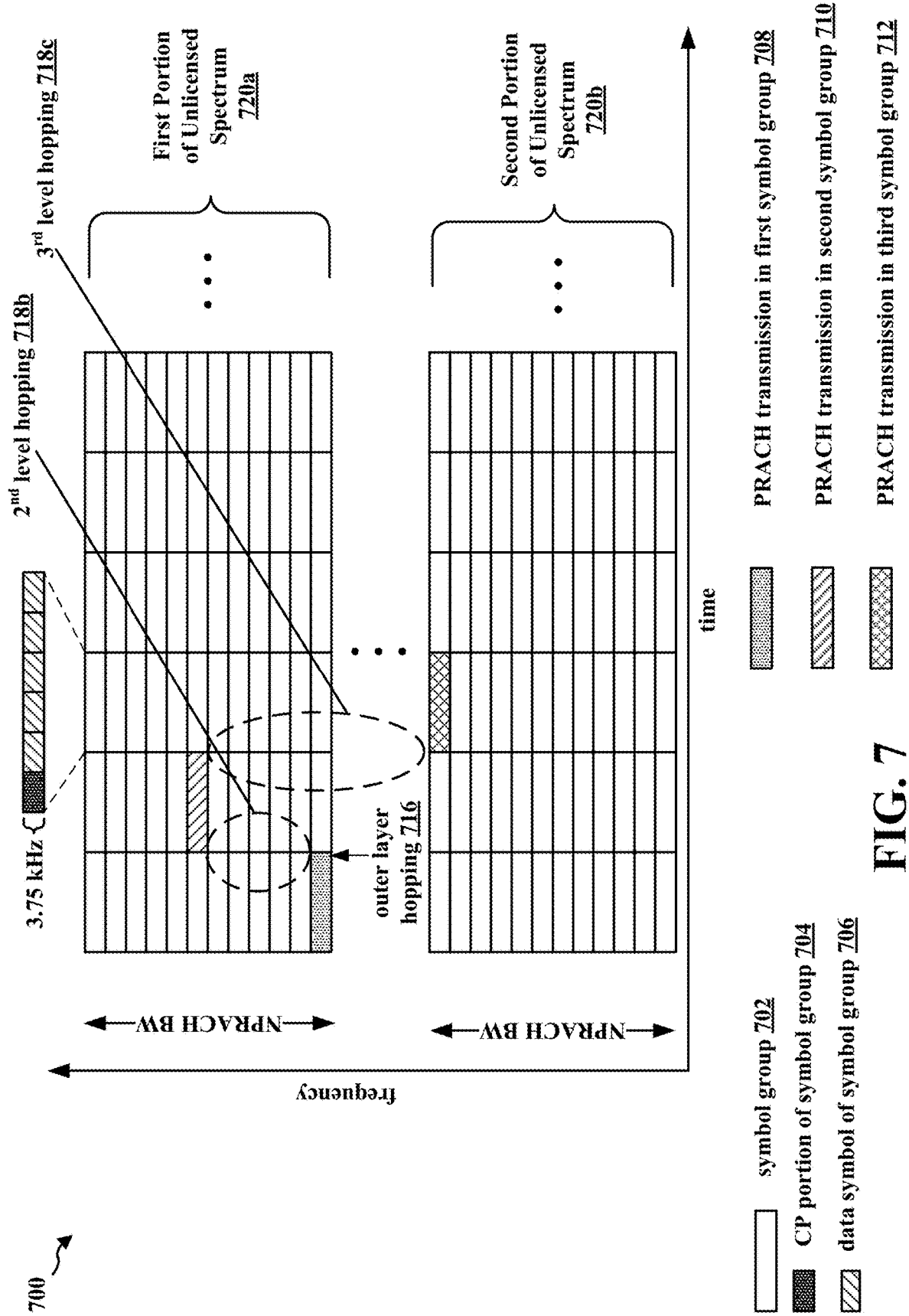
FIG. 7 illustrates an example frequency hopping configuration in accordance with certain aspects of the disclosure.

PRACH transmissions sent in a third set of adjacent tones that are located in a second portion of the unlicensed spectrum (e.g., that is non-overlapping with the first portion of the unlicensed spectrum) may be referred to as third-level frequency hopping (e.g., see 618c in FIGS. 6 and 718c in FIG. 7). The UE 402 may perform third-level frequency hopping when the base station 404 frequency hops between a first channel in the unlicensed spectrum to a second channel in the unlicensed spectrum.

Figure 4C:
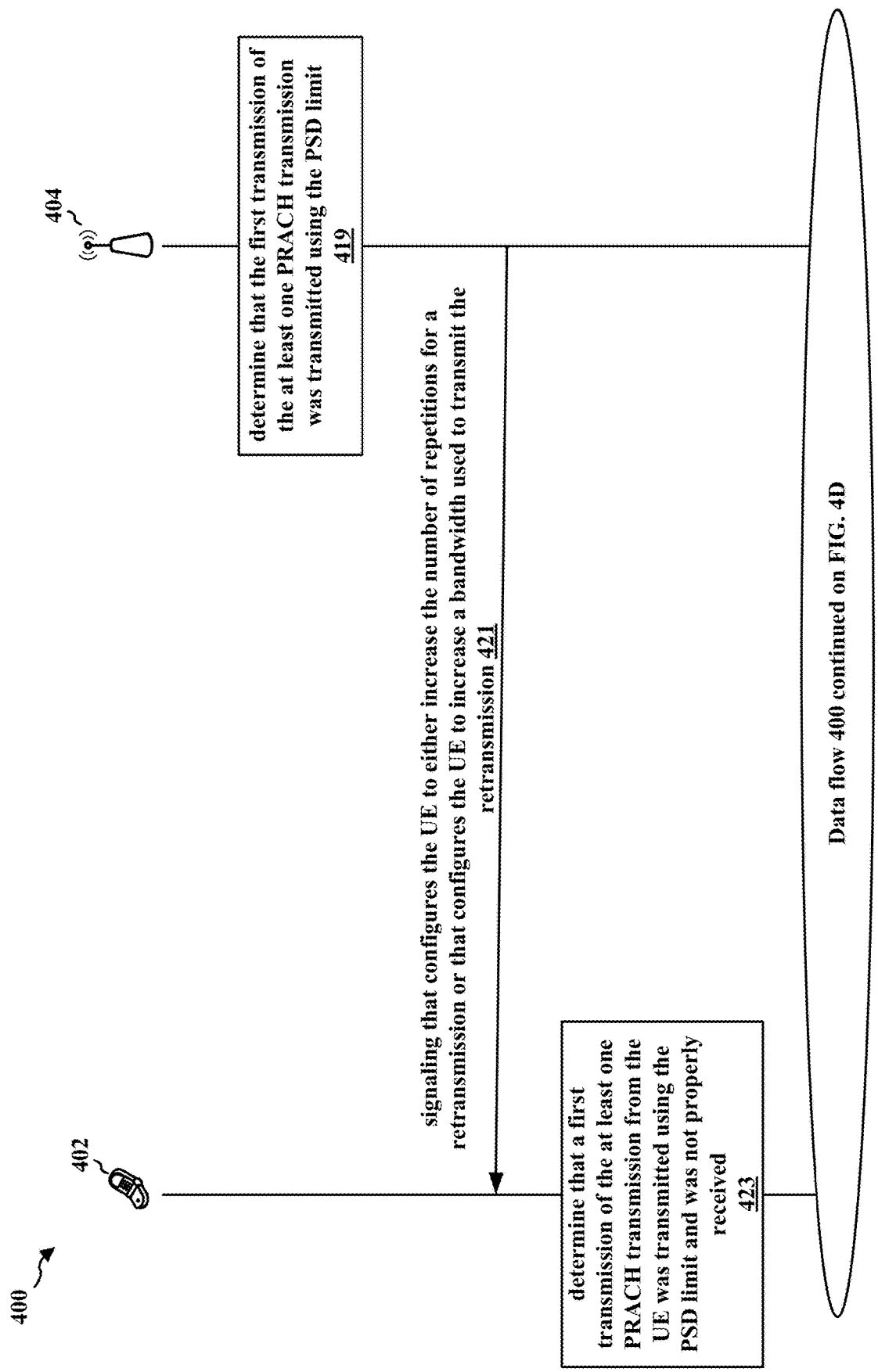

In certain scenarios, the base station 404 may determine 417 that a first transmission of the at least one PRACH transmission (e.g., 413, 415a, 415b, and/or 415c) from the UE 402 was not properly received and/or decoded. Referring to FIG. 4C, the base station 404 may also determine 419 that the first transmission of the at least one PRACH transmission (e.g., 413, 415a, 415b, and/or 415c) was transmitted by the UE 402 using the PSD limit. To increase the chance of properly receiving and/or decoding the first transmission, the base station 404 may transmit signaling 421 that either configures the UE 402 to increase the number of repetitions for a retransmission of the first transmission, or configures the UE 402 to increase a bandwidth used to transmit the retransmission of the first transmission.

Referring again to FIG. 4C, the UE 402 may determine 423 that a first transmission of the at least one PRACH transmission (e.g., 413, 415a, 415b, and/or 415c) was transmitted using the PSD limit and was not properly received by the base station 404 based on the received signaling 421.

Figure 4D:
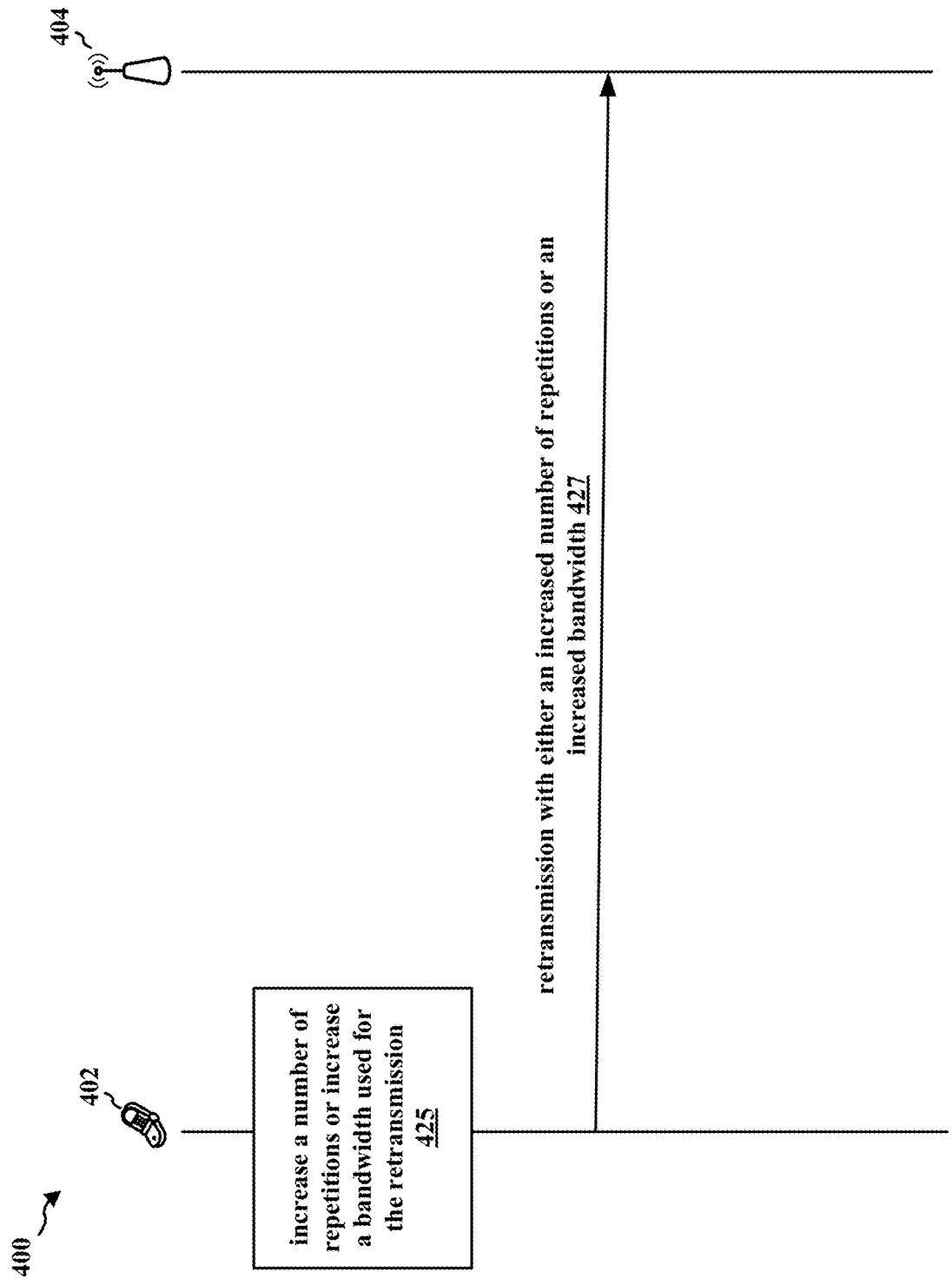

Referring to FIG. 4D, the UE 402 may increase 425 a number of repetitions or increase a bandwidth used for the PRACH retransmission. For example, when the signaling 421 configures the UE 402 to increase the number of repetitions for a retransmission of the first transmission, the UE 402 may increase the number of repetitions for the PRACH retransmission 427. Additionally and/or alternatively, when the signaling 421 configures the UE 402 to increase a bandwidth used to transmit the retransmission of the first transmission, the UE 402 may increase a bandwidth used for the PRACH retransmission 427.

Figure 5:
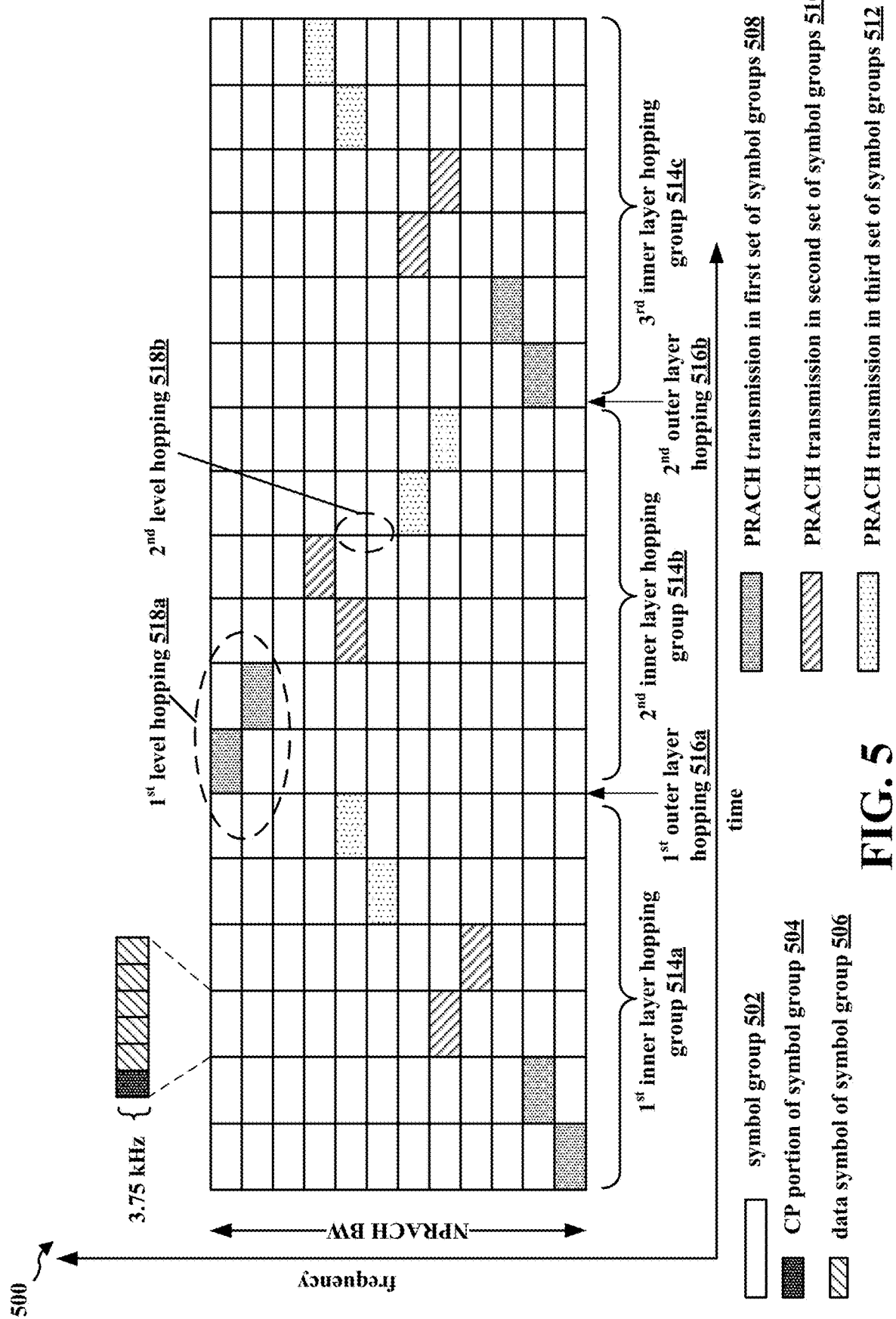
FIG. 5 illustrates an example frequency hopping configuration in accordance with certain aspects of the disclosure.

FIG. 5 is a diagram illustrating a frequency hopping configuration 500 in accordance with certain aspects of the present disclosure. For example, the frequency hopping configuration 500 may be used by a UE (e.g., 104, 350, 1250, the apparatus 902/902') to send PRACH transmissions to a base station (e.g., 102, 180, 950, eNB 310, apparatus 1202/1202').

The frequency hopping configuration 500 illustrated in FIG. 5 may be associated with a specific PRACH bandwidth (e.g., 180 kHz), resource allocation configuration, and/or maximum UE bandwidth capability. The PRACH may include a plurality of symbol groups 502 that each include a CP portion 504 and a data symbol portion 506. The CP portion 504 may have a length that accommodates timing uncertainty that may be associated with the round trip delay of a PRACH transmission.

As illustrated in FIG. 5, the frequency hopping configuration 500 may include inner layer hopping groups 514a, 514b, 514c and outer layer hopping 516a, 516b between different groups 514a, 514b, 514c. Inner layer hopping may include fixed hopping between sets of symbol groups when sending PRACH transmission(s). Outer layer hopping may include pseudo-random hopping between sets of symbol groups when sending PRACH transmission(s) located in different inner layer hopping groups. In one aspect, each of the first inner layer hopping group 514a, the second inner layer hopping group 514b, and the third inner layer hopping group 514c may include hopping between sets of symbol groups 508, 510, 512 by a fixed amount. For example, each of the sets of symbol groups 508, 510, 512 in the inner layer hopping groups 514a, 514b, 514c may be separated in frequency by, e.g., two tones (e.g., two subcarriers). In one aspect, each of the symbol groups in each set of symbol groups 508, 510, 512 may be used to transmit a PRACH transmission.

In another aspect, the first outer layer hopping 516a may include pseudo-random hopping between the first inner layer hopping group 514a and the second inner layer hopping group 514b. In addition, the second outer layer hopping 516b may include pseudo-random hopping between the second inner layer hopping group 514b and the third inner layer hopping group 514c. For example, the third set of symbol groups 512 in the first inner layer hopping group 514a may be separated from the first set of symbol groups 508 in the second inner layer hopping group 514b by, e.g., three tones. In addition, the third set of symbol groups 512 in the second inner layer hopping group 514b may be separated from the first set of symbol groups 508 in the third inner layer hopping group 514c by, e.g., a two tones.

Furthermore, the frequency hopping configuration 500 may illustrate first-level hopping 518a between symbol groups in each set of symbol groups 508, 510, 512 (e.g., hopping from one symbol group to another symbol group in an adjacent tone), and second-level hopping 518b between sets of symbol groups 508, 510, 512 (e.g., hopping from one symbol group to another symbol group in a non-adjacent tone).

FIG. 6 is a diagram illustrating a frequency hopping configuration 600 in accordance with certain aspects of the present disclosure. For example, the frequency hopping configuration 600 may be used by a UE (e.g., 104, 350, 1250, the apparatus 902/902') to send PRACH transmissions to a base station (e.g., 102, 180, 950, eNB 310, apparatus 1202/1202').

The frequency hopping configuration 600 illustrated in FIG. 6 may be associated with a specific PRACH bandwidth (e.g., 180 kHz), resource allocation, and/or maximum UE bandwidth capability of the UE. The PRACH may include a plurality of symbol groups 602 that each include a CP portion 604 and a data symbol portion 606. The CP portion 604 may have a length that accommodates timing uncertainty that may be associated with the round trip delay of a PRACH transmission.

As illustrated in FIG. 6, the frequency hopping configuration 600 may include an inner layer hopping group 614. Inner layer hopping may include fixed hopping between sets of symbol groups when sending PRACH transmission(s). In one aspect, the inner layer hopping group 614 may include hopping between sets of symbol groups 608, 610 by a fixed size. For example, each of the sets of symbol groups 608, 610 in the inner layer hopping group 614 may be separated in frequency by, e.g., five tones. Each of the symbol groups in each set of symbol groups 608, 610, 612 may be used to transmit a PRACH transmission, or a portion of a PRACH transmission.

Furthermore, the frequency hopping configuration 600 illustrates first-level hopping 618a between symbol groups in each set of symbol groups 608, 610 (e.g., hopping to an adjacent tone), second-level hopping 618b between sets of symbol groups 608, 610 (e.g., hopping to a non-adjacent tone in the first portion 620a of the unlicensed spectrum) located in the first portion of the unlicensed spectrum, and third-level hopping 618c (e.g., hopping from the second set of symbol groups 610 located in a first portion 620a of the unlicensed spectrum to a third set of symbol groups 612 located in a second portion 620b of the unlicensed spectrum). Third-level hopping 618c may occur when the base station also performs frequency hopping as discussed above.

FIG. 7 is a diagram illustrating a frequency hopping configuration 700 in accordance with certain aspects of the present disclosure. For example, the frequency hopping configuration 700 may be used by a UE (e.g., 104, 350, 1250, the apparatus 902/902') to send PRACH transmissions to a base station (e.g., 102, 180, 950, eNB 310, apparatus 1202/1202').

The frequency hopping configuration 700 illustrated in FIG. 7 may be associated with a specific PRACH bandwidth (e.g., 180 kHz), resource allocation, and/or maximum UE bandwidth. The PRACH may include a plurality of symbol groups 702 that each include a CP portion 704 and a data symbol portion 706. The CP portion 704 may have a length that accommodates timing uncertainty that may be associated with the round trip delay of a PRACH transmission.

As illustrated in FIG. 7, the frequency hopping configuration 700 may include outer layer hopping 716. Outer layer hopping may include pseudo-random hopping between symbol groups when sending PRACH transmission(s)

In one aspect, the outer layer hopping 716 may include pseudo-random hopping between the first symbol group 708 and the second symbol group 710. For example, the first symbol group 708 may be separated from the second symbol group 710 by, e.g., five tones.

Furthermore, the frequency hopping configuration 700 illustrates second-level hopping 718b between sets of symbol groups 708, 710 (e.g., hopping to a non-adjacent tone in the first portion 720a of the unlicensed spectrum), and third-level hopping 718c (e.g., hopping from the second symbol group 710 located in a first portion 720a of the unlicensed spectrum to a third symbol group 712 located in a second portion 720b of the unlicensed spectrum). Third-level hopping 718c may occur when the base station also performs frequency hopping as discussed above.

Figure 8A:
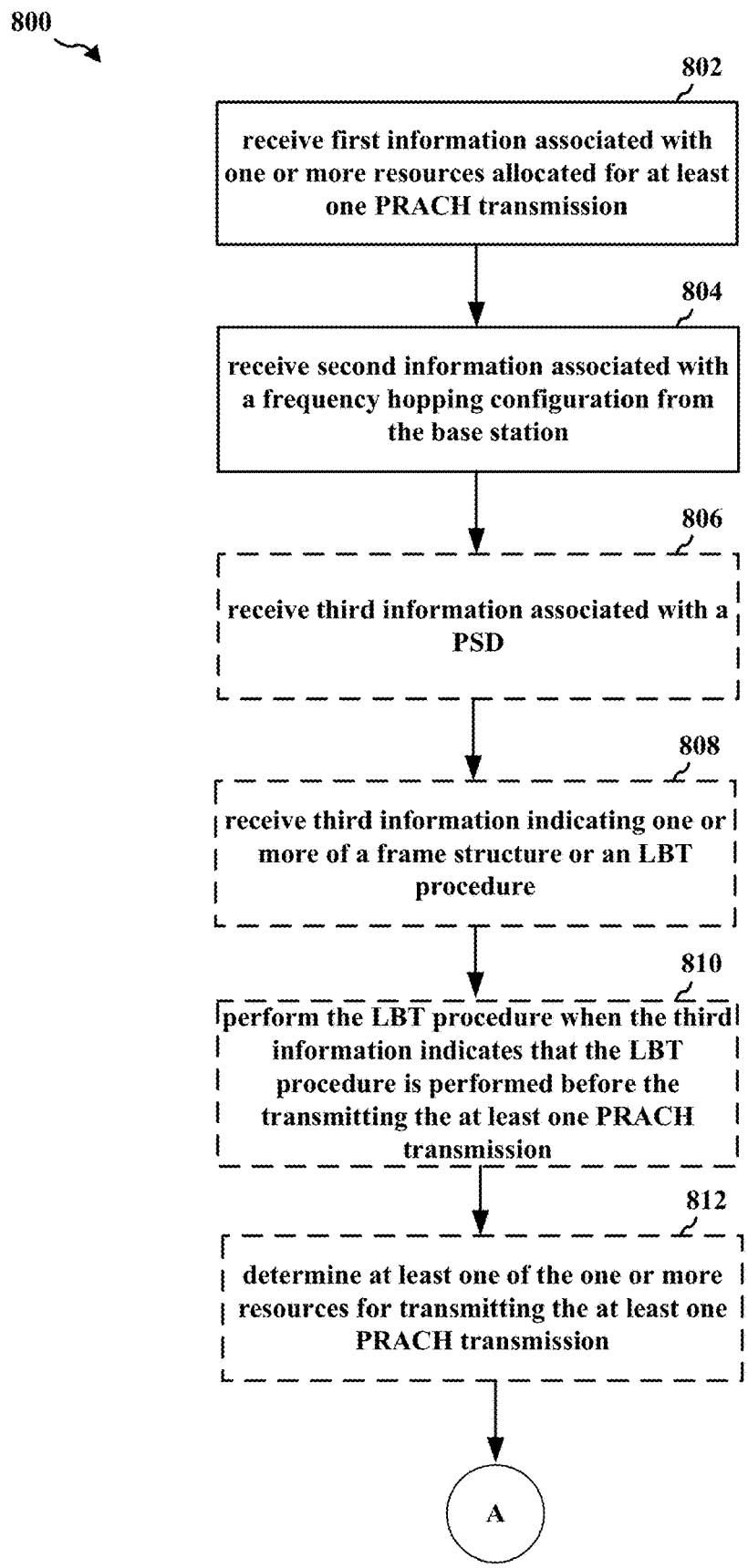
FIGS. 8A-8C are a flowchart of a method of wireless communication.
Figure 8B:
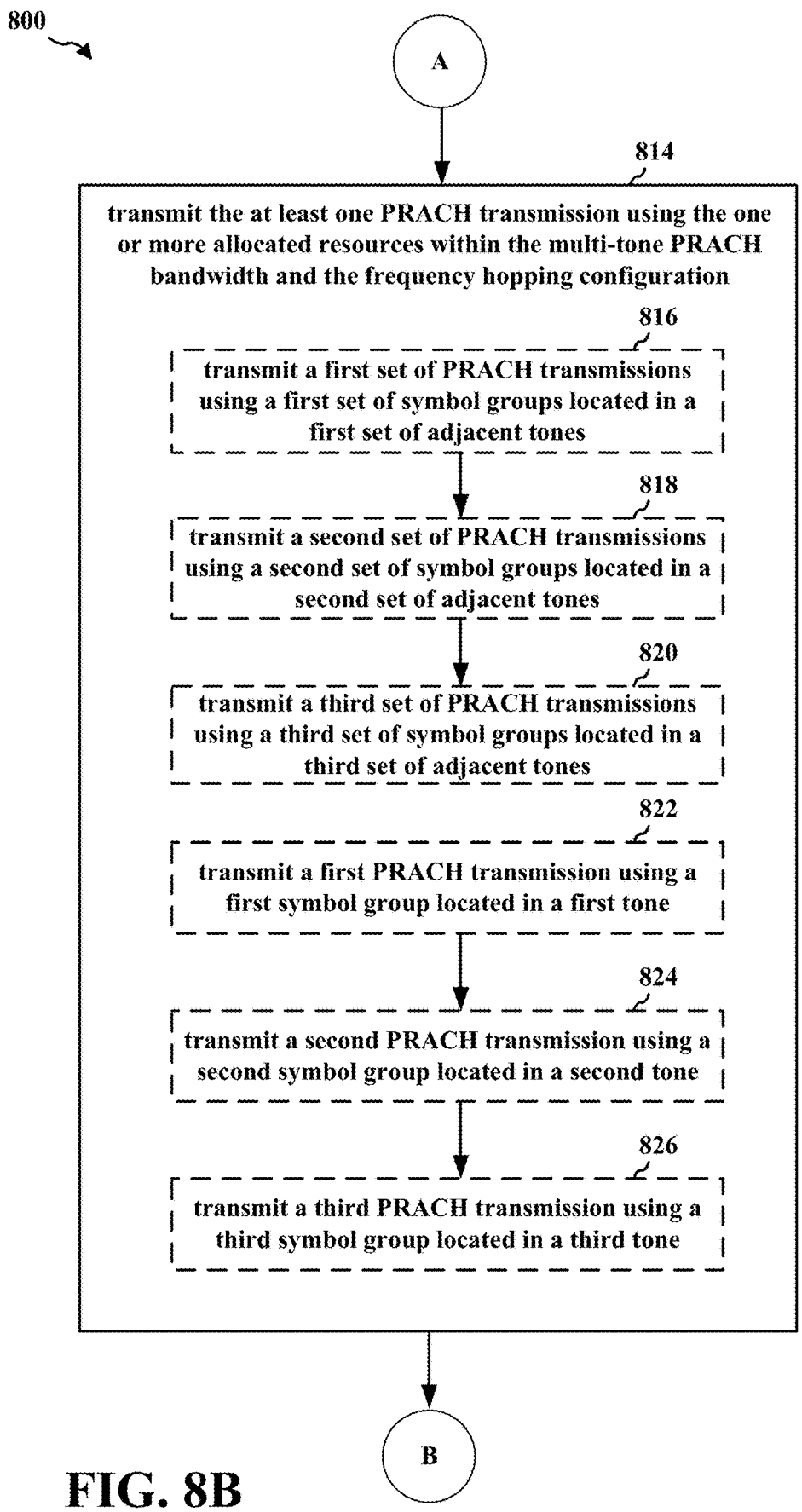
Figure 8C:
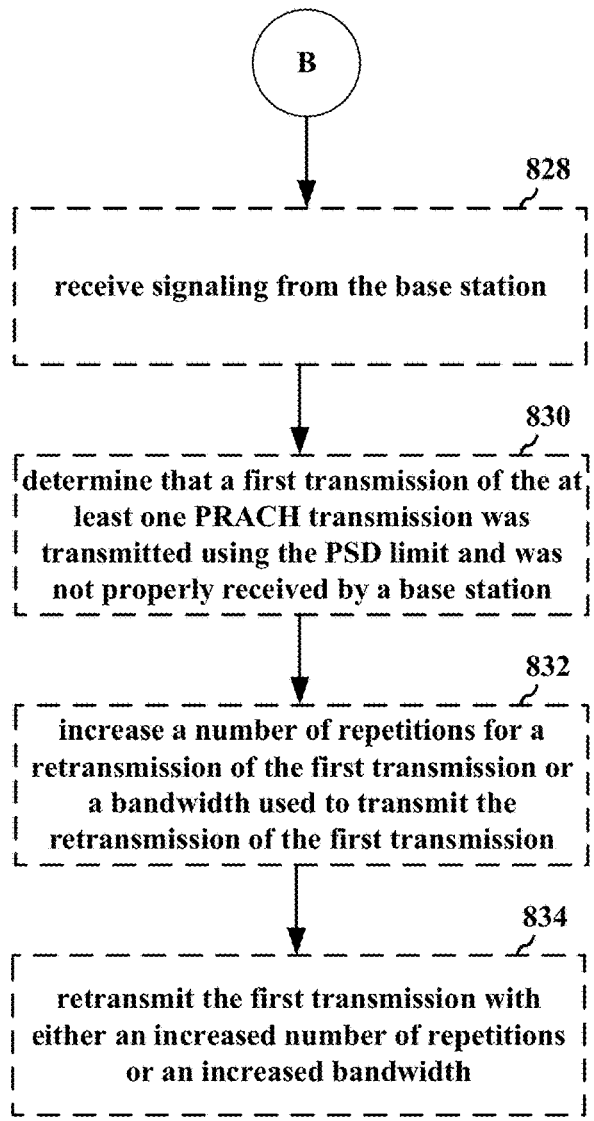

FIGS. 8A-8C are a flowchart 800 of a method of wireless communication. The method may be performed by a UE (e.g., the UE 104, 350, 1250, the apparatus 902/902') in communication with a base station (e.g., the base station 102, 180, 950, eNB 310, apparatus 1202/1202'). In FIGS. 8A-8C, optional operations are indicated with dashed lines.

Referring to FIG. 8A, at 802, the UE may receive, from a base station, first information associated with one or more resources allocated for at least one PRACH transmission. In one aspect, the one or more resources may be allocated in an unlicensed spectrum. In another aspect, the one or more resources may be allocated based on a multi-tone PRACH bandwidth. In certain aspects, the first information may indicate a tone spacing within the multi-tone PRACH bandwidth. For example, referring to FIG. 4A, the base station 404 may transmit first information 401 associated with one or more resources allocated for at least one PRACH transmission to the UE 402. In one aspect, the one or more resources may be allocated in the unlicensed spectrum, and the one or more resources may be allocated based on a PRACH bandwidth (e.g., a multi-tone PRACH bandwidth) that may also be configured by the base station 404. For example, the PRACH bandwidth configured by the base station 404 may include a 15 kHz bandwidth (e.g., four tones each with a 3.75 kHz subcarrier spacing corresponding to 12 possible hops per RB), a 45 kHz bandwidth (e.g., twelve tones each with a 3.75 kHz subcarrier spacing corresponding to 4 possible hops per RB), a 60 kHz bandwidth (e.g., sixteen tones each with a 3.75 kHz subcarrier spacing corresponding to 3 possible hops per RB), or 180 kHz bandwidth (e.g., forty-eight tones each with a 3.75 kHz subcarrier spacing), etc. In one aspect, the base station 404 may configure the PRACH bandwidth based on a maximum bandwidth supported by the base station 404 and/or a maximum bandwidth supported by the UE 402. For example, if the maximum bandwidth supported by the base station 404 and/or the UE 402 is 1 RB, then the PRACH bandwidth may be configured as 45 kHz. In addition, if the maximum bandwidth supported by the base station 404 and/or the UE 402 is 5 RBs, then the PRACH bandwidth may be configured as 180 kHz. In addition, the first information 401 may also indicate a number of repetitions associated with PRACH transmissions. For example, the number of repetitions may be four repetitions, eight repetitions, sixteen repetitions, etc. In one aspect, the number of repetitions may be associated with the PRACH bandwidth configured by the base station 404.

At 804, the UE may receive second information associated with a frequency hopping configuration from the base station. In one aspect, the frequency hopping configuration may be associated with at least one of the one or more allocated resources or the multi-tone PRACH bandwidth. For example, referring to FIG. 4A, the base station 404 may transmit second information 403 associated with a frequency hopping configuration to the UE 402. In one aspect, the frequency hopping configuration may be selected and/or configured by the base station 404 based on one or more of the resources allocated for PRACH transmissions, the multi-tone PRACH bandwidth, and/or a maximum bandwidth capability of the UE 402. Sending PRACH transmissions using frequency hopping may provide the benefit of improving the time delay estimation and improving frequency offset estimation accuracy at the base station. For example, the signal model for a PRACH transmission described above may illustrate the benefit of using a frequency hopping configuration for PRACH transmissions in a multi-tone PRACH bandwidth.

At 806, the UE may receive third information associated with a PSD. In one aspect, the PSD may be associated with one or more physical channels. In another aspect, the third information may indicate if a PSD limit applies to the one or more physical channels. In a further aspect, the third information may indicate the PSD limit when the PSD limit applies to the one or more physical channels. In one aspect, the third information is received in a SIB on an anchor channel or a frequency hopping channel. For example, referring to FIG. 4A, the base station 404 may transmit third information 405 associated with a PDS to the UE 402. In one aspect, the third information 405 may indicate one or more of the transmission power used for PRACH transmissions based on the PRACH bandwidth. Additionally and/or alternatively, the third information 405 may indicate if a PSD limit is applicable to a physical channel (e.g., PRACH, PUCCH, PUSCH, etc.) and may provide the PSD limit. The third information 405 may be transmitted in, e.g., a SIB. The PSD limit may be the maximum transmission power the UE 402 may use to send an uplink transmission to the base station 404 (e.g., using the PRACH, PUCCH, PUSCH, etc.). In one aspect, the transmission power used for an initial PRACH transmission based on the PRACH bandwidth may be less than the PSD limit. If the initial PRACH transmission is not properly received and/or decoded by the base station 404, the UE 402 may increase the transmission power up to but not exceeding the PSD limit for the PRACH. In a first aspect, when the multi-tone PRACH bandwidth is 15 kHz, the third information 405 may indicate that the PSD (e.g., transmission power) associated with a PRACH transmission from the UE 402 may be, e.g., 15 dBm. In a second aspect, when the multi-tone PRACH bandwidth is 45 kHz, the third information 405 may indicate that the PSD (e.g., transmission power) associated with a PRACH transmission from the UE 402 may be, e.g., 19.7 dBm. In a third aspect, when the multi-tone PRACH bandwidth is 60 kHz, the third information 405 may indicate that the PSD (e.g., transmission power) associated with a PRACH transmission from the UE 402 may be, e.g., 21 dBm. In a fourth aspect, when the multi-tone PRACH bandwidth is 180 kHz, the third information 405 may indicate that the PSD (e.g., transmission power) associated with a PRACH transmission from the UE 402 may be, e.g., 25.78 dBm. Alternatively, information associated with the PSD for a PRACH transmission discussed above may be included in first information 401, or in separate signaling (e.g., not illustrated in FIGS. 4A-4D). In another configuration, the UE 402 may be pre-configured with knowledge of each transmission power associated with the various PRACH bandwidths. Thus, when the first information 401 is received indicating the PRACH bandwidth, the UE 402 may determine the associated PSD based on the pre-configured knowledge without the third information 405 being transmitted.

At 808, the UE may receive third information indicating one or more of a frame structure associated with the one or more resources allocated for the at least one PRACH transmission or indicating if a LBT procedure is performed before transmitting the at least one PRACH transmission. The third information in step 808 may be referred to as fourth information if third information is received at 806. For example, referring to FIG. 4A, the base station 404 may transmit fourth information 407 (e.g., or third information if third information 405 is not received) that indicates a frame structure associated with the one or more resources allocated for the at least one PRACH transmission. For example, the fourth information 407 may indicate the number of UL subframes, DL subframes, and/or special subframes in each radio frame. In addition, the fourth information 407 may indicate which UL subframes are unavailable for PRACH transmissions by the UE 402. Additionally and/or alternatively, the fourth information 407 may indicate if a LBT procedure is performed before the UE 402 transmits one or more PRACH transmissions. In one aspect, the fourth information 407 may indicate how frequently the UE 402 performs the LBT procedure (e.g., before each PRACH transmission, before every other PRACH transmissions, before a first PRACH transmission in each radio frame, etc.). A LBT procedure may include sensing a channel (e.g., using energy detection) prior to transmission to determine if the channel is idle or if signals from other users are detected on the channel.

At 810, the UE may perform the LBT procedure when the third information (e.g., fourth information when third information is received at 806) indicates that the LBT procedure is performed before the transmitting the at least one PRACH transmission. For example, referring to FIG. 4A, based on the fourth information 407, the UE 402 may determine 409 to perform an LBT procedure before transmitting a PRACH transmission. For example, the UE 402 may transmit a PRACH transmission if the channel is idle, and the UE 402 may not transmit a PRACH transmission if signals from other users are detected on the channel (e.g., if the channel is not idle). Performing LBT may be beneficial for coexistence with different RATs (e.g., Wi-Fi and NB-IoT/eMTC) in the unlicensed spectrum.

At 812, the UE may determine at least one of the one or more resources for transmitting the at least one PRACH transmission. In one aspect, the at least one of the one or more resources determined may be based on a bandwidth capability of the UE. For example, referring to FIG. 4A, the UE 402 may determine 411 at least one of the one or more allocated resources indicated in the first information 401 for transmitting at least one PRACH transmission. In one aspect, the UE 402 may determine 411 which allocated resources to use for a PRACH transmission based a bandwidth capability of the UE 402. For example, when the first information 401 indicates a number of different resource configurations that may be available to the UE 402, the UE 402 may determine 411 which of the different resource configurations to use for a PRACH transmission based on the bandwidth capability of the UE 402. In one aspect, the maximum bandwidth that is supported by the UE 402 may be, e.g., 1 RB. In another aspect, the maximum bandwidth that is supported by the UE 402 may be, e.g., 6 RBs. In a further configuration, the maximum bandwidth that may be supported by the UE 402 may be, e.g., more than 6 RBs. A UE 402 with a maximum bandwidth of 1 RB may use one or more first allocated resources (e.g., indicated in the first information 401) for a PRACH transmission. A UE 402 with a maximum supported bandwidth of 6 RBs may use one or more second allocated resources (e.g., a greater number of resources than the first allocated resources) for a PRACH transmission. In addition, a UE 402 with a maximum supported bandwidth of more than 6 RBs may use one or more third allocated resources (e.g., a greater number of resources than the first allocated resources and the second allocated resources).

Referring to FIG. 4B, at 814, the UE may transmit, to the base station, the at least one PRACH transmission using the one or more allocated resources within the multi-tone PRACH bandwidth and the frequency hopping configuration. For example, referring to FIG. 4B, the UE 402 may transmit at least one PRACH transmission 413 using the one or more allocated resources within the configured PRACH bandwidth and using the hopping configuration. In certain configurations, the frequency hopping configuration may include a two-level frequency hopping configuration as described above in connection with FIG. 5 (e.g., first level hopping and second level hopping) and FIG. 7 (e.g., second level hopping and third level hopping). In certain other configurations, the frequency hopping configuration may include a three-level frequency hopping configuration, as described above in connection with FIG. 6 (e.g., first level hopping, second level hopping, and third level hopping).

At 816, the UE may transmit the at least one PRACH transmission using the frequency hopping configuration by transmitting a first set of PRACH transmissions using a first set of symbol groups located in a first set of adjacent tones. In one aspect, transmitting the first set of PRACH transmissions in the first set of adjacent tones may comprise first level frequency hopping. In one aspect, referring to FIG. 4A, the UE 402 may transmit the at least one PRACH transmission 413 by transmitting a first set of PRACH transmissions 415a using a first set of symbol groups located in a first set of adjacent tones, as discussed above in connection with FIGS. 5 and 6. Transmitting PRACH transmissions in symbol groups located in adjacent tones may be referred to a first-level frequency hopping (e.g., see 518a in FIG. 5, and 618a in FIG. 6). In one aspect, the first of adjacent tones may be located in a first portion of the unlicensed spectrum.

At 818, the UE may transmit the at least one PRACH transmission using the frequency hopping configuration by transmitting a second set of PRACH transmissions using a second set of symbol groups located in a second set of adjacent tones. In one aspect, the second set of adjacent tones may be non-adjacent to the first set of adjacent tones. In another aspect, the first set of adjacent tones and the second set of adjacent tones may be located in a first portion of the unlicensed spectrum. In a further aspect, transmitting the second set of PRACH transmissions in the second set of adjacent tones that are non-adjacent to the first set of adjacent tones may comprise second level frequency hopping. For example, referring to FIG. 4B, the UE 402 may transmit the at least one PRACH transmission 413 by transmitting a second set of PRACH transmissions 415b using a second set of symbol groups located in a second set of adjacent tones, as discussed above with respect to FIGS. 5 and 6. In one aspect, the second set of adjacent tones may be non-adjacent to the first set of adjacent tones. PRACH transmissions sent in a second set of adjacent tones that are non-adjacent to the first set of adjacent tones may be referred to a second-level frequency hopping (e.g., see 518b in FIG. 5, 618b in FIG. 6, and 718b in FIG. 7). In addition, the second set of adjacent tones may also located in the first portion of the unlicensed spectrum (e.g., the same part of the unlicensed spectrum as the first set of adjacent tones).

At 820, the UE may transmit the at least one PRACH transmission using the frequency hopping configuration by transmitting a third set of PRACH transmissions using a third set of symbol groups located in a third set of adjacent tones. In one aspect, the third set of adjacent tones may be located in a second portion of the unlicensed spectrum that is non-overlapping with the first portion of the unlicensed spectrum. In another aspect, transmitting the third set of PRACH transmissions in the third set of adjacent tones that are in the second portion of the unlicensed spectrum that is non-overlapping with the first portion of the unlicensed spectrum may comprise third level frequency hopping. For example, referring to FIG. 4B, the UE 402 may transmit at least one PRACH transmission 413 by transmitting a third set of PRACH transmissions 415c using a third set of symbol groups located in a third set of adjacent tones. In one aspect, the third set of adjacent tones may be located in a second portion of the unlicensed spectrum that is non-overlapping with the first portion of the unlicensed spectrum. For example, the UE 402 may transmit PRACH transmissions in symbol groups located in a different portion of the unlicensed spectrum when the base station 404 performs frequency hopping. For example, the base station 404 may perform frequency hopping by switching a carrier among different frequency channels (e.g., narrowband channels) to exploit the frequency diversity of the unlicensed spectrum. In one aspect, the base station 404 may switch from a first frequency channel in the first portion of the unlicensed spectrum to a second frequency channel in the second portion of the unlicensed spectrum. PRACH transmissions sent in a third set of adjacent tones that are located in a second portion of the unlicensed spectrum (e.g., that is non-overlapping with the first portion of the unlicensed spectrum) may be referred to as third-level frequency hopping (e.g., see 618c in FIGS. 6 and 718c in FIG. 7). The UE 402 may perform third-level frequency hopping when the base station 404 frequency hops between a first channel in the unlicensed spectrum to a second channel in the unlicensed spectrum.

At 822, the UE may transmit the at least one PRACH transmission using the frequency hopping configuration by transmitting a first PRACH transmission using a first symbol group located in a first tone. For example, referring to FIG. 7, the outer layer hopping 716 may include pseudo-random hopping between the first symbol group 708 and the second symbol group 710. For example, the first symbol group 708 may be separated from the second symbol group 710 by, e.g., five tones.

At 824, the UE may transmit the at least one PRACH transmission using the frequency hopping configuration by transmitting a second PRACH transmission using a second symbol group located in a second tone. In one aspect, the second tone may be non-adjacent to the first tone. In another aspect, the first tone and the second tone may be located in a first portion of the unlicensed spectrum. In a further aspect, transmitting the second PRACH transmission in the second tone that is non-adjacent to the first tone may comprise second level frequency hopping. For example, referring to FIG. 7, the outer layer hopping 716 may include pseudo-random hopping between the first symbol group 708 and the second symbol group 710. For example, the first symbol group 708 may be separated from the second symbol group 710 by, e.g., five tones.

At 826, the UE may transmit the at least one PRACH transmission using the frequency hopping configuration by transmitting a third PRACH transmission using a third symbol group located in a third tone. In one aspect, the third tone may be located in a second portion of the unlicensed spectrum that is non-overlapping with the first portion of the unlicensed spectrum. For example, referring to FIG. 7, the frequency hopping configuration 700 illustrates second-level hopping 718b between sets of symbol groups 708, 710 (e.g., hopping to a non-adjacent tone), and third-level hopping 718c (e.g., hopping from the second symbol group 710 located in a first portion 720a of the unlicensed spectrum to a third symbol group 712 located in a second portion 720b of the unlicensed spectrum). Third-level hopping 718c may occur when the base station also performs frequency hopping as discussed above.

Referring to FIG. 8C, at 828, the UE may receive signaling from the base station that configures the UE to increase the number of repetitions for the retransmission of the first transmission, and/or configures the UE to increase a bandwidth used to transmit the retransmission of the first transmission. For example, referring to FIG. 4C, the base station 404 may transmit signaling 421 that either configures the UE 402 to increase the number of repetitions for a retransmission of the first transmission, or configures the UE 402 to increase a bandwidth used to transmit the retransmission of the first transmission.

At 830, the UE may determine that a first transmission of the at least one PRACH transmission was transmitted using the PSD limit and was not properly received by a base station. For example, referring to FIG. 4C, the UE 402 may determine 423 that a first transmission of the at least one PRACH transmission (e.g., 413, 415a, 415b, and/or 415c) was transmitted using the PSD limit and was not properly received by the base station 404 based on the received signaling 421.

At 832, the UE may increase a number of repetitions for a retransmission of the first transmission or increasing a bandwidth used to transmit the retransmission of the first transmission. For example, referring to FIG. 4D, the UE 402 may increase 425 a number of repetitions or increase a bandwidth used for the PRACH retransmission.

At 834, the UE may retransmit the first transmission with either an increased number of repetitions or an increased bandwidth. For example, referring to FIG. 4D, when the signaling 421 configures the UE 402 to increase the number of repetitions for a retransmission of the first transmission, the UE 402 may increase the number of repetitions for the PRACH retransmission 427. Additionally and/or alternatively, when the signaling 421 configures the UE 402 to increase a bandwidth used to transmit the retransmission of the first transmission, the UE 402 may increase a bandwidth used for the PRACH retransmission 427.

Figure 9:
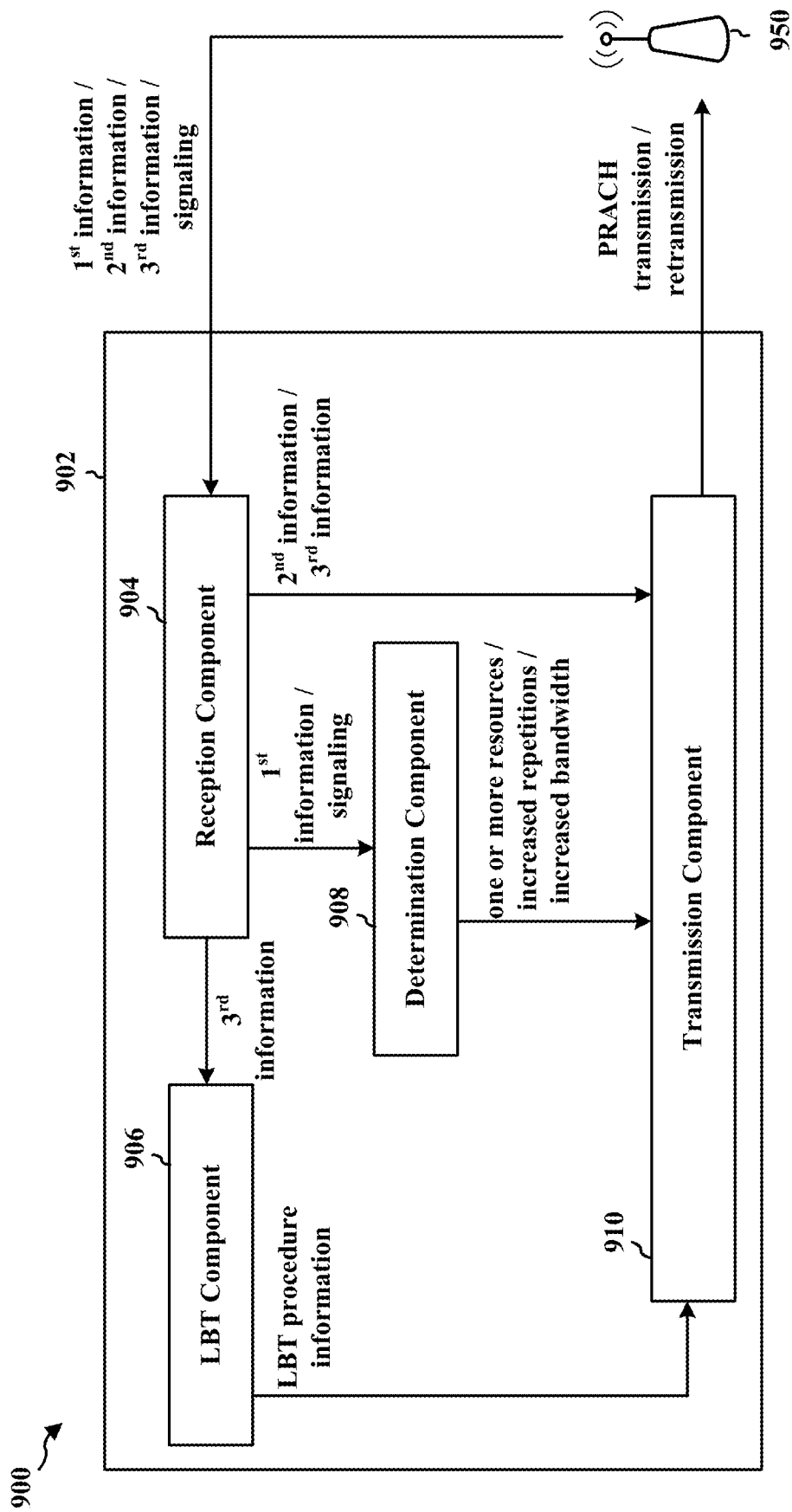
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., the UE 104, 350, 1250, the apparatus 902') in communication with a base station 950 (e.g., the base station 102, 180, eNB 310, apparatus 1202/1202'). The apparatus may include a reception component 904, an LBT component 906, a determination component 908, and a transmission component 910.

The reception component 904 may be configured to receive, from the base station 950, first information associated with one or more resources allocated for at least one PRACH transmission. In one aspect, the one or more resources may be allocated in an unlicensed spectrum. In another aspect, the one or more resources may be allocated based on a multi-tone PRACH bandwidth. In certain aspects, the first information may indicate a tone spacing within the multi-tone PRACH bandwidth. The reception component 904 may be configured to send a signal associated with the first information to the determination component 908. In addition, the reception component 904 may be configured to receive second information associated with a frequency hopping configuration from the base station. In one aspect, the frequency hopping configuration may be associated with at least one of the one or more allocated resources or the multi-tone PRACH bandwidth. The reception component 904 may be configured to send a signal associated with the second information to the transmission component 910. Further, the reception component 904 may be configured to receive third information associated with a PSD. In one aspect, the PSD may be associated with one or more physical channels. In another aspect, the third information may indicate if a PSD limit applies to the one or more physical channels. In a further aspect, the third information may further indicate the PSD limit when the PSD limit applies to the one or more physical channels. In one aspect, the third information is received in a SIB. The reception component 904 may be configured to send a signal associated with the third information indicating a PSD and/or PSD limit to the transmission component 910. In addition, the reception component 904 may be configured to receive third information indicating one or more of a frame structure associated with the one or more resources allocated for the at least one PRACH transmission or indicating if a LBT procedure is performed before transmitting the at least one PRACH transmission. The reception component 904 may be configured to send a signal associated with the third information that indicates if an LBT procedure is performed to the LBT component 906.

The LBT component 906 may be configured to perform the LBT procedure when the third information indicates that the LBT procedure is performed before the transmitting the at least one PRACH transmission. In addition, the LBT component 906 may be configured to send a signal associated with the outcome of the LBT procedure (e.g., indicating if a transmission may be sent) to the transmission component 910.

The determination component 908 may be configured to determine at least one of the one or more resources for transmitting the at least one PRACH transmission. In one aspect, the at least one of the one or more resources determined may be based on a bandwidth capability of the UE. In addition, the determination component 908 may be configured to send a signal associated with the determined resources to the transmission component 910.

The transmission component 910 may be configured to transmit, to the base station 950, the at least one PRACH transmission using the one or more allocated resources within the multi-tone PRACH bandwidth and the frequency hopping configuration. In one aspect, the transmission component 910 may be configured to transmit the at least one PRACH transmission using the frequency hopping configuration by transmitting a first set of PRACH transmissions using a first set of symbol groups located in a first set of adjacent tones. In one aspect, transmitting the first set of PRACH transmissions in the first set of adjacent tones may comprise first level frequency hopping. In another aspect, the transmission component 910 may be configured to transmit the at least one PRACH transmission using the frequency hopping configuration by transmitting a second set of PRACH transmissions using a second set of symbol groups located in a second set of adjacent tones. In one aspect, the second set of adjacent tones may be non-adjacent to the first set of adjacent tones. In another aspect, the first set of adjacent tones and the second set of adjacent tones may be located in a first portion of the unlicensed spectrum. In a further aspect, transmitting the second set of PRACH transmissions in the second set of adjacent tones that are non-adjacent to the first set of adjacent tones may comprise second level frequency hopping. In a further aspect, the transmission component 910 may be configured to transmit the at least one PRACH transmission using the frequency hopping configuration by transmitting a third set of PRACH transmissions using a third set of symbol groups located in a third set of adjacent tones. In one aspect, the third set of adjacent tones may be located in a second portion of the unlicensed spectrum that is non-overlapping with the first portion of the unlicensed spectrum. In another aspect, transmitting the third set of PRACH transmissions in the third set of adjacent tones that are in the second portion of the unlicensed spectrum that is non-overlapping with the first portion of the unlicensed spectrum may comprise third level frequency hopping. In one aspect, the transmission component 910 may be configured to transmit the at least one PRACH transmission using the frequency hopping configuration by transmitting a first PRACH transmission using a first symbol group located in a first tone. In another aspect, the transmission component 910 may be configured to transmit the at least one PRACH transmission using the frequency hopping configuration by transmitting a second PRACH transmission using a second symbol group located in a second tone. In one aspect, the second tone may be non-adjacent to the first tone. In another aspect, the first tone and the second tone may be located in a first portion of the unlicensed spectrum. In a further aspect, transmitting the second PRACH transmission in the second tone that is non-adjacent to the first tone may comprise second level frequency hopping. In a further aspect, the transmission component 910 may be configured to may transmit the at least one PRACH transmission using the frequency hopping configuration by transmitting a third PRACH transmission using a third symbol group located in a third tone. In one aspect, the third tone may be located in a second portion of the unlicensed spectrum that is non-overlapping with the first portion of the unlicensed spectrum.

The reception component 904 may be configured to receive signaling from the base station that either configures the UE to increase the number of repetitions for the retransmission of the first transmission, or configures the UE to increase a bandwidth used to transmit the retransmission of the first transmission. In addition, the reception component 904 may be configured to send a signal associated with the received signaling to the determination component 908.

Further, the determination component 908 may be configured to determine that a first transmission of the at least one PRACH transmission was transmitted using the PSD limit and was not properly received by the base station 950. The determination component 908 may be configured to send a signal associated with one or more of the increased number of repetition and/or the increased transmission bandwidth to the transmission component 910.

The transmission component 910 may be configured to increase a number of repetitions for a retransmission of the first transmission or increasing a bandwidth used to transmit the retransmission of the first transmission. Further, the transmission component 910 may be configured to retransmit the first transmission with either an increased number of repetitions or an increased bandwidth.

The apparatus may include additional components that perform each of the blocks of the algorithm in the aforementioned flowcharts of FIGS. 8A-8C. As such, each block in the aforementioned flowcharts of FIGS. 8A-8C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
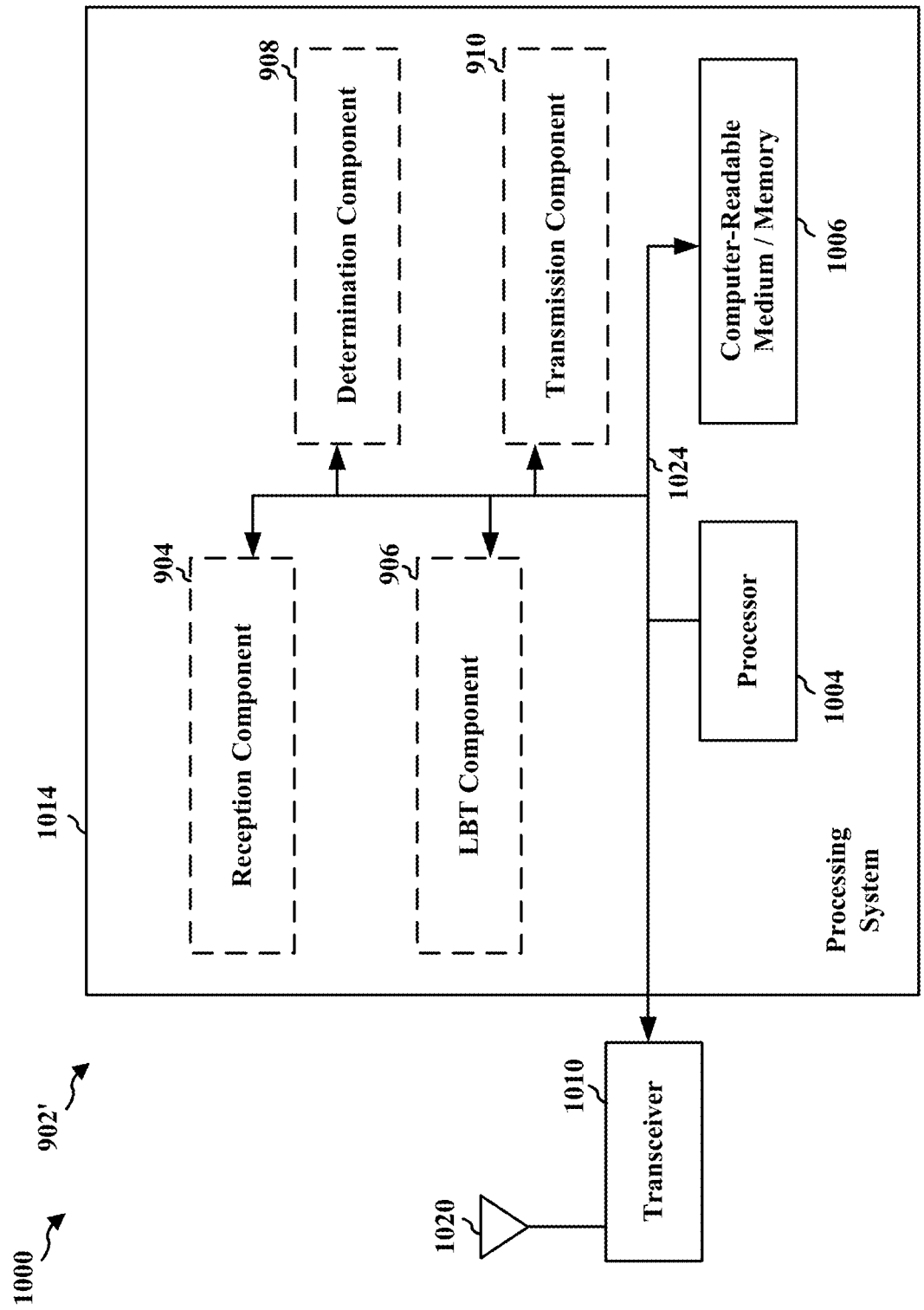
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described above for any particular apparatus. The computer-readable medium/memory 1006 may also be used for storing data that is manipulated by the processor 1004 when executing software. The processing system 1014 further includes at least one of the components 904, 906, 908, 910. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication may include means for receiving, from a base station, first information associated with one or more resources allocated for at least one PRACH transmission. In one aspect, the one or more resources may be allocated in an unlicensed spectrum. In another aspect, the one or more resources may be allocated based on a multi-tone PRACH bandwidth. In certain aspects, the first information may indicate a tone spacing within the multi-tone PRACH bandwidth. In another configuration, the apparatus 902/902' for wireless communication may include means for receiving second information associated with a frequency hopping configuration from the base station. In one aspect, the frequency hopping configuration may be associated with at least one of the one or more allocated resources or the multi-tone PRACH bandwidth. In a further configuration, the apparatus 902/902' for wireless communication may include means for receiving third information associated with a PSD. In one aspect, the PSD may be associated with one or more physical channels. In another aspect, the third information may indicate if a PSD limit applies to the one or more physical channels. In a further aspect, the third information may further indicate the PSD limit when the PSD limit applies to the one or more physical channels. In one aspect, the third information may be received in a SIB on an anchor channel or a frequency hopping channel. In one configuration, the apparatus 902/902' for wireless communication may include means for receiving third information indicating one or more of a frame structure associated with the one or more resources allocated for the at least one PRACH transmission or indicating if a LBT procedure is performed before transmitting the at least one PRACH transmission. In another configuration, the apparatus 902/902' for wireless communication may include means for performing the LBT procedure when the third information indicates that the LBT procedure is performed before the transmitting the at least one PRACH transmission. In further configuration, the apparatus 902/902' for wireless communication may include means for determining at least one of the one or more resources for transmitting the at least one PRACH transmission. In one aspect, the at least one of the one or more resources determined may be based on a bandwidth capability of the UE. In one configuration, the apparatus 902/902' for wireless communication may include means for transmitting, to the base station, the at least one PRACH transmission using the one or more allocated resources within the multi-tone PRACH bandwidth and the frequency hopping configuration. In one aspect, the means for transmitting the at least one PRACH transmission using the frequency hopping configuration may be configured to transmit a first set of PRACH transmissions using a first set of symbol groups located in a first set of adjacent tones. In one aspect, transmitting the first set of PRACH transmissions in the first set of adjacent tones may comprise first level frequency hopping. In another aspect, the means for transmitting the at least one PRACH transmission using the frequency hopping configuration may be configured to transmit a second set of PRACH transmissions using a second set of symbol groups located in a second set of adjacent tones. In one aspect, the second set of adjacent tones may be non-adjacent to the first set of adjacent tones. In another aspect, the first set of adjacent tones and the second set of adjacent tones may be located in a first portion of the unlicensed spectrum. In a further aspect, transmitting the second set of PRACH transmissions in the second set of adjacent tones that are non-adjacent to the first set of adjacent tones may comprise second level frequency hopping. In a further configuration, the means for transmitting the at least one PRACH transmission using the frequency hopping configuration may be configured to transmit a third set of PRACH transmissions using a third set of symbol groups located in a third set of adjacent tones. In one aspect, the third set of adjacent tones may be located in a second portion of the unlicensed spectrum that is non-overlapping with the first portion of the unlicensed spectrum. In another aspect, transmitting the third set of PRACH transmissions in the third set of adjacent tones that are in the second portion of the unlicensed spectrum that is non-overlapping with the first portion of the unlicensed spectrum may comprise third level frequency hopping. In another aspect, the means for transmitting the at least one PRACH transmission using the frequency hopping configuration may be configured to transmit a first PRACH transmission using a first symbol group located in a first tone. In a further aspect, the means for transmitting the at least one PRACH transmission using the frequency hopping configuration by transmitting a second PRACH transmission using a second symbol group located in a second tone. In one aspect, the second tone may be non-adjacent to the first tone. In another aspect, the first tone and the second tone may be located in a first portion of the unlicensed spectrum. In a further aspect, transmitting the second PRACH transmission in the second tone that is non-adjacent to the first tone may comprise second level frequency hopping. In another aspect, the means for transmitting the at least one PRACH transmission using the frequency hopping configuration may be configured to a third PRACH transmission using a third symbol group located in a third tone. In one aspect, the third tone may be located in a second portion of the unlicensed spectrum that is non-overlapping with the first portion of the unlicensed spectrum. In one configuration, the apparatus 902/902' for wireless communication may include means for receiving signaling from the base station that either configures the UE to increase the number of repetitions for the retransmission of the first transmission, or configures the UE to increase a bandwidth used to transmit the retransmission of the first transmission. In another configuration, the apparatus 902/902' for wireless communication may include means for determining that a first transmission of the at least one PRACH transmission was transmitted using the PSD limit and was not properly received by a base station. In a further configuration, the apparatus 902/902' for wireless communication may include means for increasing a number of repetitions for a retransmission of the first transmission or increasing a bandwidth used to transmit the retransmission of the first transmission. In another configuration, the apparatus 902/902' for wireless communication may include means for retransmitting the first transmission with either an increased number of repetitions or an increased bandwidth.

The aforementioned means may be one or more of the aforementioned components of the apparatus 902 and/or the processing system 1014 of the apparatus 902' configured to perform the functions recited by the aforementioned means. As described above, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11A:
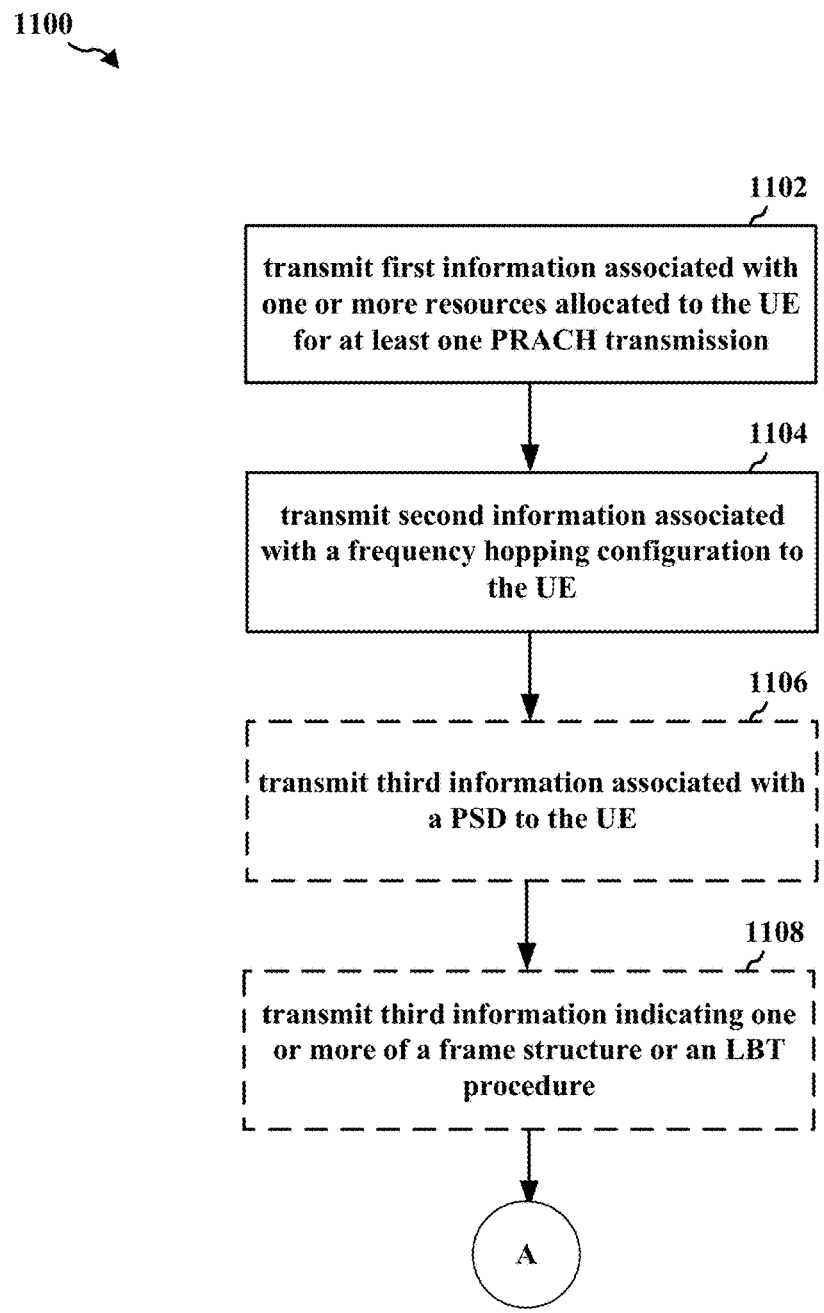
FIGS. 11A-11C are a flowchart of a method of wireless communication.
Figure 11B:
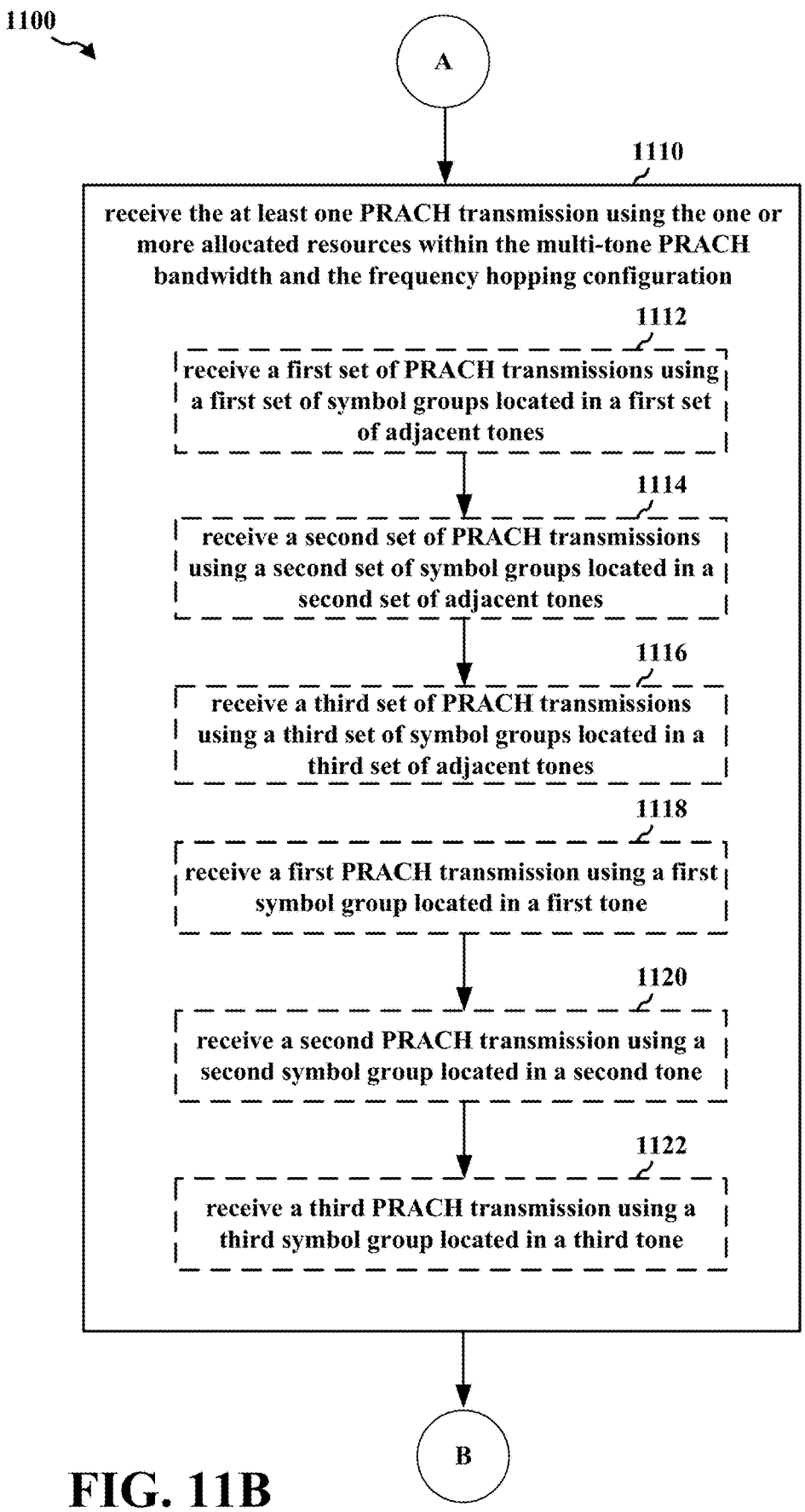
Figure 11C:
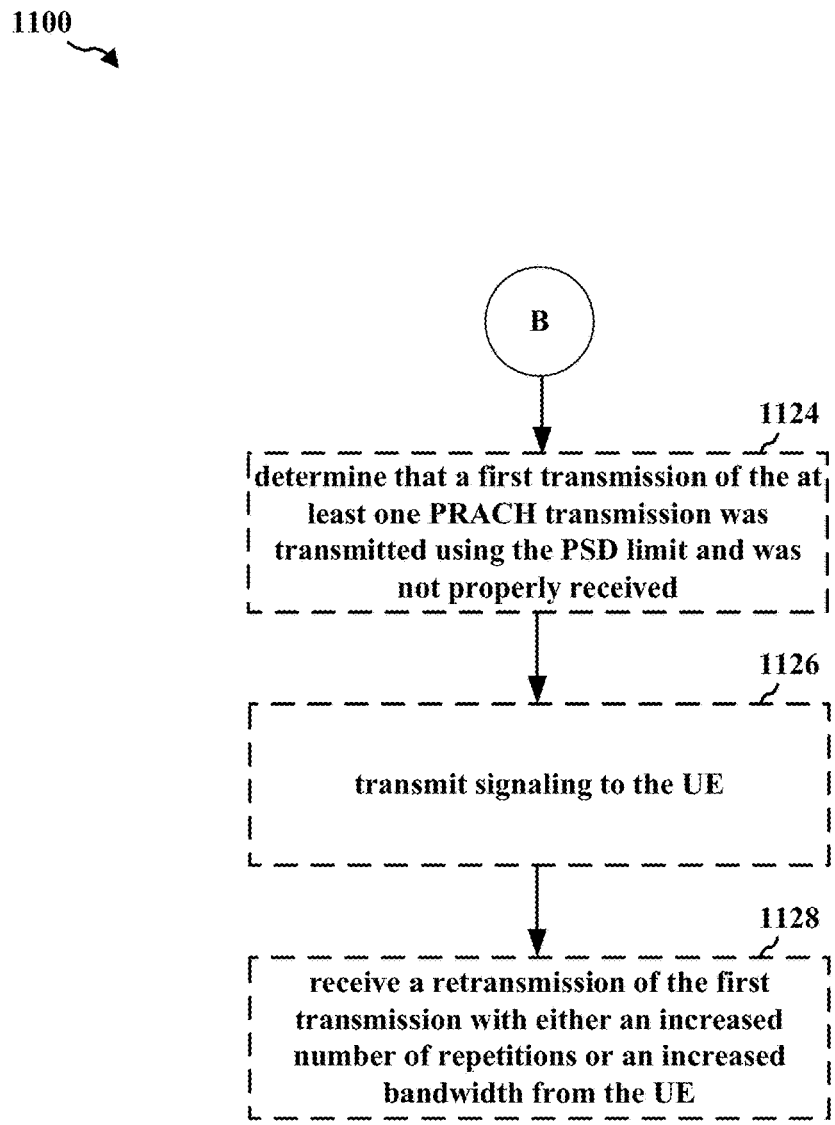

FIGS. 11A-11C are a flowchart 1100 of a method of wireless communication.

The method may be performed by a base station (e.g., the base station 102, 180, 950, eNB 310, apparatus 1202/1202') in communication with a UE (e.g., the UE 104, 350, 1250, the apparatus 902/902'). In FIGS. 11A-11C, optional operations are indicated with dashed lines.

Referring to FIG. 11A, at 1102, the base station may transmit, to a UE, first information associated with one or more resources allocated to the UE for at least one PRACH transmission. In one aspect, the one or more resources may be allocated in an unlicensed spectrum. In another aspect, the one or more resources may be allocated based on a multi-tone PRACH bandwidth. In certain aspects, the first information may indicate a tone spacing within the multi-tone PRACH bandwidth. For example, referring to FIG. 4A, the base station 404 may transmit first information 401 associated with one or more resources allocated for at least one PRACH transmission to the UE 402. In one aspect, the one or more resources may be allocated in the unlicensed spectrum, and the one or more resources may be allocated based on a PRACH bandwidth (e.g., a multi-tone PRACH bandwidth) that may also be configured by the base station 404. For example, the PRACH bandwidth configured by the base station 404 may include a 15 kHz bandwidth (e.g., four tones each with a 3.75 kHz subcarrier spacing corresponding to 12 possible hops per RB), a 45 kHz bandwidth (e.g., twelve tones each with a 3.75 kHz subcarrier spacing corresponding to 4 possible hops per RB), a 60 kHz bandwidth (e.g., sixteen tones each with a 3.75 kHz subcarrier spacing corresponding to 3 possible hops per RB), or 180 kHz bandwidth (e.g., forty-eight tones each with a 3.75 kHz subcarrier spacing), etc. In one aspect, the base station 404 may configure the PRACH bandwidth based on a maximum bandwidth supported by the base station 404 and/or a maximum bandwidth supported by the UE 402. For example, if the maximum bandwidth supported by the base station 404 and/or the UE 402 is 1 RB, then the PRACH bandwidth may be configured as 45 kHz. In addition, if the maximum bandwidth supported by the base station 404 and/or the UE 402 is 5 RBs, then the PRACH bandwidth may be configured as 180 kHz. In addition, the first information 401 may also indicate a number of repetitions associated with PRACH transmissions. For example, the number of repetitions may be four repetitions, eight repetitions, sixteen repetitions, etc. In one aspect, the number of repetitions may be associated with the PRACH bandwidth configured by the base station 404.

At 1104, the base station may transmit second information associated with a frequency hopping configuration to the UE. In one aspect, the frequency hopping configuration may be associated with at least one of the one or more allocated resources or the multi-tone PRACH bandwidth. For example, referring to FIG. 4A, the base station 404 may transmit second information 403 associated with a frequency hopping configuration to the UE 402. In one aspect, the frequency hopping configuration may be selected and/or configured by the base station 404 based on one or more of the resources allocated for PRACH transmissions, the multi-tone PRACH bandwidth, and/or a maximum bandwidth capability of the UE 402. Sending PRACH transmissions using frequency hopping may provide the benefit of improving the time delay estimation and improving frequency offset estimation accuracy at the base station. For example, the signal model for a PRACH transmission described above may illustrate the benefit of using a frequency hopping configuration for PRACH transmissions in a multi-tone PRACH bandwidth.

At 1106, the base station may transmit third information associated with a PSD to the UE. In one aspect, the PSD may be associated with one or more physical channels. In another aspect, the third information may indicate if a PSD limit applies to the one or more physical channels. In a further aspect, the third information further indicates the PSD limit when the PSD limit applies to the one or more physical channels. In one aspect, the third information may be transmitted in a SIB on an anchor channel or a frequency hopping channel. For example, referring to FIG. 4A, the base station 404 may transmit third information 405 associated with a PDS to the UE 402. In one aspect, the third information 405 may indicate one or more of the transmission power used for PRACH transmissions based on the PRACH bandwidth. Additionally and/or alternatively, the third information 405 may indicate if a PSD limit is applicable to a physical channel (e.g., PRACH, PUCCH, PUSCH, etc.) and may provide the PSD limit. The third information 405 may be transmitted in, e.g., a SIB. The PSD limit may be the maximum transmission power the UE 402 may use to send an uplink transmission to the base station 404 (e.g., using the PRACH, PUCCH, PUSCH, etc.). In one aspect, the transmission power used for an initial PRACH transmission based on the PRACH bandwidth may be less than the PSD limit. If the initial PRACH transmission is not properly received and/or decoded by the base station 404, the UE 402 may increase the transmission power up to but not exceeding the PSD limit for the PRACH. In a first aspect, when the multi-tone PRACH bandwidth is 15 kHz, the third information 405 may indicate that the PSD (e.g., transmission power) associated with a PRACH transmission from the UE 402 may be, e.g., 15 dBm. In a second aspect, when the multi-tone PRACH bandwidth is 45 kHz, the third information 405 may indicate that the PSD (e.g., transmission power) associated with a PRACH transmission from the UE 402 may be, e.g., 19.7 dBm. In a third aspect, when the multi-tone PRACH bandwidth is 60 kHz, the third information 405 may indicate that the PSD (e.g., transmission power) associated with a PRACH transmission from the UE 402 may be, e.g., 21 dBm. In a fourth aspect, when the multi-tone PRACH bandwidth is 180 kHz, the third information 405 may indicate that the PSD (e.g., transmission power) associated with a PRACH transmission from the UE 402 may be, e.g., 25.78 dBm. Alternatively, information associated with the PSD for a PRACH transmission discussed above may be included in first information 401, or in separate signaling (e.g., not illustrated in FIGS. 4A-4D). In another configuration, the UE 402 may be pre-configured with knowledge of each transmission power associated with the various PRACH bandwidths. Thus, when the first information 401 is received indicating the PRACH bandwidth, the UE 402 may determine the associated PSD based on the pre-configured knowledge without the third information 405 being transmitted.

At 1108, the base station may transmit third information indicating one or more of a frame structure associated with the one or more resources allocated for the at least one PRACH transmission or indicating if a LBT procedure is performed before the UE transmits the at least one PRACH transmission. For example, referring to FIG. 4A, the base station 404 may transmit fourth information 407 (e.g., or third information if third information 405 is not transmitted) that indicates a frame structure associated with the one or more resources allocated for the at least one PRACH transmission. For example, the fourth information 407 may indicate the number of UL subframes, DL subframes, and/or special subframes in each radio frame. In addition, the fourth information 407 may indicate which UL subframes are unavailable for PRACH transmissions by the UE 402. Additionally and/or alternatively, the fourth information 407 may indicate if a listen-before-talk (LBT) procedure is performed before the UE 402 transmits one or more PRACH transmissions. In one aspect, the fourth information 407 may indicate how frequently the UE 402 performs the LBT procedure (e.g., before each PRACH transmission, before every other PRACH transmissions, before a first PRACH transmission in each radio frame, etc.). A LBT procedure may include sensing a channel (e.g., using energy detection) prior to transmission to determine if the channel is idle or if signals from other users are detected on the channel.

Referring to FIG. 11B, at 1110, the base station may receive, from the UE, the at least one PRACH transmission using the one or more allocated resources within the multi-tone PRACH bandwidth and the frequency hopping configuration. For example, referring to FIG. 4B, the UE 402 may transmit at least one PRACH transmission 413 using the one or more allocated resources within the configured PRACH bandwidth and using the frequency hopping configuration. In certain configurations, the frequency hopping configuration may include a two-level frequency hopping configuration as described above with respect to FIG. 5 (e.g., first level hopping and second level hopping) and FIG. 7 (e.g., second level hopping and third level hopping). In certain other configurations, the frequency hopping configuration may include a three-level frequency hopping configuration, as described above with respect to FIG. 6 (e.g., first level hopping, second level hopping, and third level hopping).

At 1112, the base station may receive the at least one PRACH transmission using the frequency hopping configuration by receiving a first set of PRACH transmissions using a first set of symbol groups located in a first set of adjacent tones. In one aspect, referring to FIG. 4A, the UE 402 may transmit the at least one PRACH transmission 413 by transmitting a first set of PRACH transmissions 415a using a first set of symbol groups located in a first set of adjacent tones, as discussed above with respect to FIGS. 5 and 6. Transmitting PRACH transmissions in symbol groups located in adjacent tones may be referred to a first-level frequency hopping (e.g., see 518a in FIG. 5, and 618a in FIG. 6). In one aspect, the first of adjacent tones may be located in a first portion of the unlicensed spectrum.

At 1114, the base station may receive the at least one PRACH transmission using the frequency hopping configuration by receiving a second set of PRACH transmissions using a second set of symbol groups located in a second set of adjacent tones. In one aspect, the second set of adjacent tones may be non-adjacent to the first set of adjacent tones.

In another aspect, the first set of adjacent tones and the second set of adjacent tones may be located in a first portion of the unlicensed spectrum. For example, referring to FIG. 4B, the UE 402 may transmit the at least one PRACH transmission 413 by transmitting a second set of PRACH transmissions 415*b* using a second set of symbol groups located in a second set of adjacent tones, as discussed above with respect to FIGS. 5 and 6. In one aspect, the second set of adjacent tones may be non-adjacent to the first set of adjacent tones. PRACH transmissions sent in a second set of adjacent tones that are non-adjacent to the first set of adjacent tones may be referred to a second-level frequency hopping (e.g., see 518*b* in FIG. 5, 618*b* in FIG. 6, and 718*b* in FIG. 7). In addition, the second set of adjacent tones may also located in the first portion of the unlicensed spectrum (e.g., the same part of the unlicensed spectrum as the first set of adjacent tones).

At 1116, the base station may receive the at least one PRACH transmission using the frequency hopping configuration by receiving a third set of PRACH transmissions using a third set of symbol groups located in a third set of adjacent tones. In one aspect, the third set of adjacent tones may be located in a second portion of the unlicensed spectrum that is non-overlapping with the first portion of the unlicensed spectrum. For example, referring to FIG. 4B, the UE 402 may transmit at least one PRACH transmission 413 by transmitting a third set of PRACH transmissions 415*c* using a third set of symbol groups located in a third set of adjacent tones. In one aspect, the third set of adjacent tones may be located in a second portion of the unlicensed spectrum that is non-overlapping with the first portion of the unlicensed spectrum. For example, the UE 402 may transmit PRACH transmissions in symbol groups located in a different portion of the unlicensed spectrum when the base station 404 performs frequency hopping. For example, the base station 404 may perform frequency hopping by switching a carrier among different frequency channels (e.g., narrowband channels) to exploit the frequency diversity of the unlicensed spectrum. In one aspect, the base station 404 may switch from a first frequency channel in the first portion of the unlicensed spectrum to a second frequency channel in the second portion of the unlicensed spectrum. PRACH transmissions sent in a third set of adjacent tones that are located in a second portion of the unlicensed spectrum (e.g., that is non-overlapping with the first portion of the unlicensed spectrum) may be referred to as third-level frequency hopping (e.g., see 618*c* in FIGS. 6 and 718*c* in FIG. 7). The UE 402 may perform third-level frequency hopping when the base station 404 frequency hops between a first channel in the unlicensed spectrum to a second channel in the unlicensed spectrum.

At 1118, the base station may receive the at least one PRACH transmission using the frequency hopping configuration by receiving a first PRACH transmission using a first symbol group located in a first tone. For example, referring to FIG. 7, the outer layer hopping 716 may include pseudo-random hopping between the first symbol group 708 and the second symbol group 710. For example, the first symbol group 708 may be separated from the second symbol group 710 by, e.g., five tones.

At 1120, the base station may receive the at least one PRACH transmission using the frequency hopping configuration by receiving a second PRACH transmission using a second symbol group located in a second tone. In one aspect, the second tone may be non-adjacent to the first tone. In another aspect, the first tone and the second tone may be located in a first portion of the unlicensed spectrum. For example, referring to FIG. 7, the outer layer hopping 716 may include pseudo-random hopping between the first symbol group 708 and the second symbol group 710. For example, the first symbol group 708 may be separated from the second symbol group 710 by, e.g., five tones.

At 1122, the base station may receive the at least one PRACH transmission using the frequency hopping configuration by receiving a third PRACH transmission using a third symbol group located in a third tone. In one aspect, the third tone may be located in a second portion of the unlicensed spectrum that is non-overlapping with the first portion of the unlicensed spectrum. For example, referring to FIG. 7, the frequency hopping configuration 700 illustrates second-level hopping 718*b* between sets of symbol groups 708, 710 (e.g., hopping to a non-adjacent tone), and third-level hopping 718*c* (e.g., hopping from the second symbol group 710 located in a first portion 720*a* of the unlicensed spectrum to a third symbol group 712 located in a second portion 720*b* of the unlicensed spectrum). Third-level hopping 718*c* may occur when the base station also performs frequency hopping as discussed above.

Referring to FIG. 11C, at 1124, the base station may determine that a first transmission of the at least one PRACH transmission was transmitted using the PSD limit and was not properly received. For example, referring to FIGS. 4B and 4C, the base station 404 may determine 417 that a first transmission of the at least one PRACH transmission (e.g., 413, 415*a*, 415*b*, and/or 415*c*) from the UE 402 was not properly received and/or decoded. In addition, the base station 404 may also determine 419 that the first transmission of the at least one PRACH transmission (e.g., 413, 415*a*, 415*b*, and/or 415*c*) was transmitted by the UE 402 using the PSD limit. In one aspect, the base station 404 may transmit signaling 421 that either configures the UE 402 to increase the number of repetitions for a retransmission of the first transmission, or configures the UE 402 to increase a bandwidth used to transmit the retransmission of the first transmission.

At 1126, the base station may transmit signaling that either configures the UE to increase the number of repetitions for a retransmission of the first transmission, or configures the UE to increase a bandwidth used to transmit the retransmission of the first transmission. For example, referring to FIG. 4C, the base station 404 may transmit signaling 421 that either configures the UE 402 to increase the number of repetitions for a retransmission of the first transmission, or configures the UE 402 to increase a bandwidth used to transmit the retransmission of the first transmission.

At 1128, the base station may receive a retransmission of the first transmission with either an increased number of repetitions or an increased bandwidth from the UE. For example, referring to FIG. 4D, when the signaling 421 configures the UE 402 to increase the number of repetitions for a retransmission of the first transmission, the UE 402 may increase the number of repetitions for the PRACH retransmission 427 that may be received by the base station 404. Additionally and/or alternatively, when the signaling 421 configures the UE 402 to increase a bandwidth used to transmit the retransmission of the first transmission, the UE 402 may increase a bandwidth used for the PRACH retransmission 427 that may be received by the base station 404.

Figure 12:
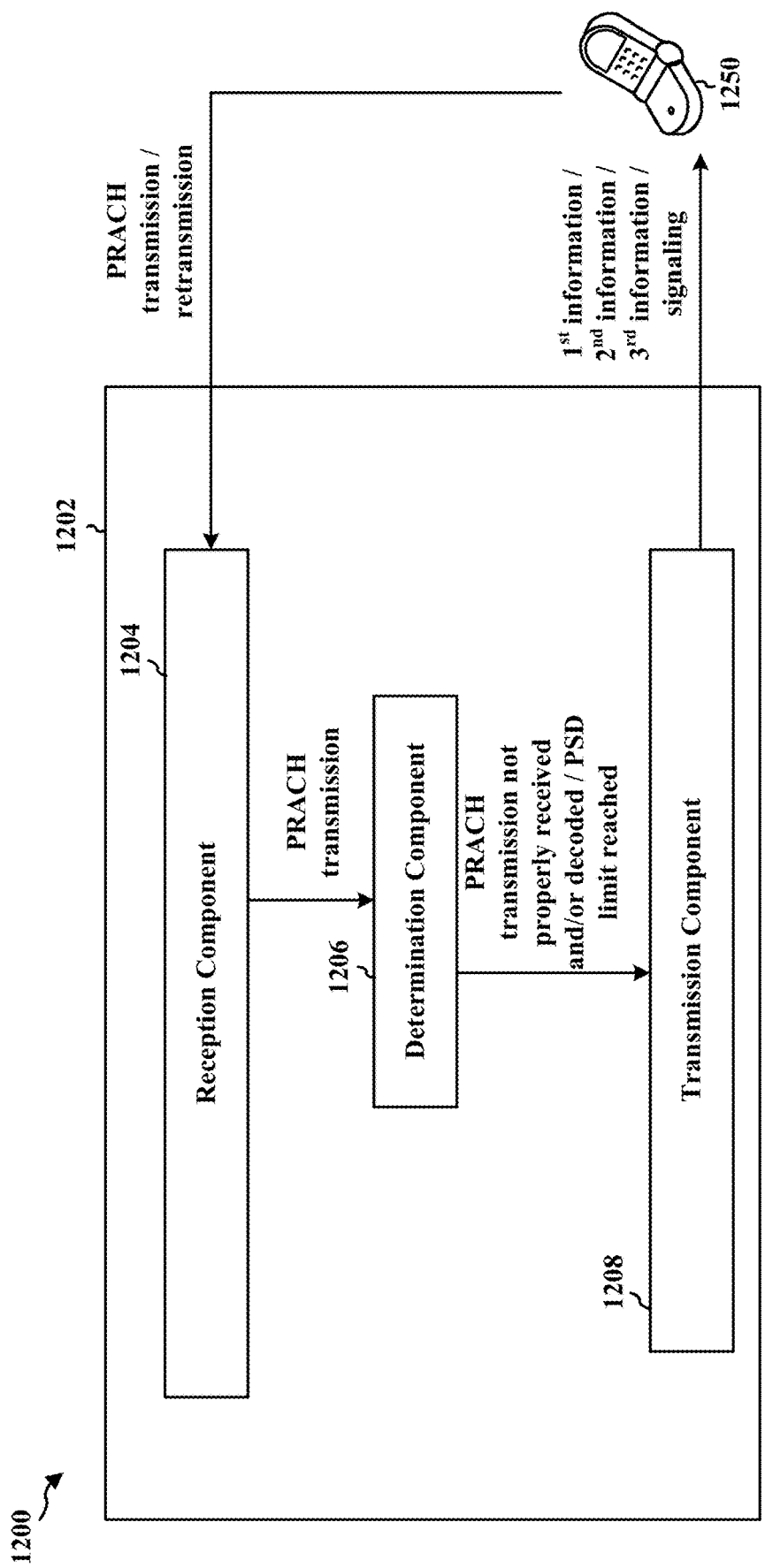
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station (e.g., the base station 102, 180, 950, eNB 310, apparatus 1202') in communication with a UE 1250 (e.g., the UE 104, 350, the apparatus 902/902'). The apparatus may include a reception component 1204, a determination component 1206, and/or a transmission component 1208.

The transmission component 1208 may be configured to transmit, to the UE 1250, first information associated with one or more resources allocated to the UE 1250 for at least one PRACH transmission. In one aspect, the one or more resources may be allocated in an unlicensed spectrum. In another aspect, the one or more resources may be allocated based on a multi-tone PRACH bandwidth. In certain aspects, the first information may indicate a tone spacing within the multi-tone PRACH bandwidth. In addition, the transmission component 1208 may be configured to transmit second information associated with a frequency hopping configuration to the UE. In one aspect, the frequency hopping configuration may be associated with at least one of the one or more allocated resources or the multi-tone PRACH bandwidth. Further, the transmission component 1208 may be configured to transmit third information associated with a PSD to the UE. In one aspect, the PSD may be associated with one or more physical channels. In another aspect, the third information may indicate if a PSD limit applies to the one or more physical channels. In a further aspect, the third information further indicates the PSD limit when the PSD limit applies to the one or more physical channels. In one aspect, the third information is received in a SIB on an anchor channel or frequency hopping channel. Additionally and/or alternatively, the transmission component 1208 may be configured to transmit third information indicating one or more of a frame structure associated with the one or more resources allocated for the at least one PRACH transmission or indicating if a LBT procedure is performed before the UE transmits the at least one PRACH transmission.

The reception component 1204 may be configured to receive, from the UE 1250, the at least one PRACH transmission using the one or more allocated resources within the multi-tone PRACH bandwidth and the frequency hopping configuration. In one aspect, the reception component 1204 may be configured to receive the at least one PRACH transmission using the frequency hopping configuration by receiving a first set of PRACH transmissions using a first set of symbol groups located in a first set of adjacent tones. In another aspect, the reception component 1204 may be configured to receive the at least one PRACH transmission using the frequency hopping configuration by receiving a second set of PRACH transmissions using a second set of symbol groups located in a second set of adjacent tones. In one aspect, the second set of adjacent tones may be non-adjacent to the first set of adjacent tones. In another aspect, the first set of adjacent tones and the second set of adjacent tones may be located in a first portion of the unlicensed spectrum. In a further aspect, the reception component 1204 may be configured to receive the at least one PRACH transmission using the frequency hopping configuration by receiving a third set of PRACH transmissions using a third set of symbol groups located in a third set of adjacent tones. In one aspect, the third set of adjacent tones may be located in a second portion of the unlicensed spectrum that is non-overlapping with the first portion of the unlicensed spectrum. In one aspect, the reception component 1204 may be configured to receive the at least one PRACH transmission using the frequency hopping configuration by receiving a first PRACH transmission using a first symbol group located in a first tone. In another aspect, the reception component 1204 may be configured to receive the at least one PRACH transmission using the frequency hopping configuration by receiving a second PRACH transmission using a second symbol group located in a second tone. In one aspect, the second tone may be non-adjacent to the first tone. In another aspect, the first tone and the second tone may be located in a first portion of the unlicensed spectrum. In a further aspect, the reception component 1204 may be configured to receive the at least one PRACH transmission using the frequency hopping configuration by receiving a third PRACH transmission using a third symbol group located in a third tone, the third tone being located in a second portion of the unlicensed spectrum that is non-overlapping with the first portion of the unlicensed spectrum. In addition, the reception component 1204 may send a signal associated with the at least one PRACH transmission to the determination component 1206.

The determination component 1206 may be configured to determine that a first transmission of the at least one PRACH transmission was transmitted using the PSD limit and was not properly received. The determination component 1206 may be configured to send a signal associated with an increase in repetitions for a retransmission and/or a signal associated with an increase in transmission bandwidth for a retransmission to the transmission component 1208.

The transmission component 1208 may be configured to transmit signaling that either configures the UE 1250 to increase the number of repetitions for a retransmission of the first transmission, or configures the UE 1250 to increase a bandwidth used to transmit the retransmission of the first transmission.

Further, the reception component 1204 may be configured to receive a retransmission of the first transmission with either an increased number of repetitions or an increased bandwidth from the UE 1250.

The apparatus may include additional components that perform each of the blocks of the algorithm in the aforementioned flowcharts of FIGS. 11A-11C. As such, each block in the aforementioned flowcharts of FIGS. 11A-11C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
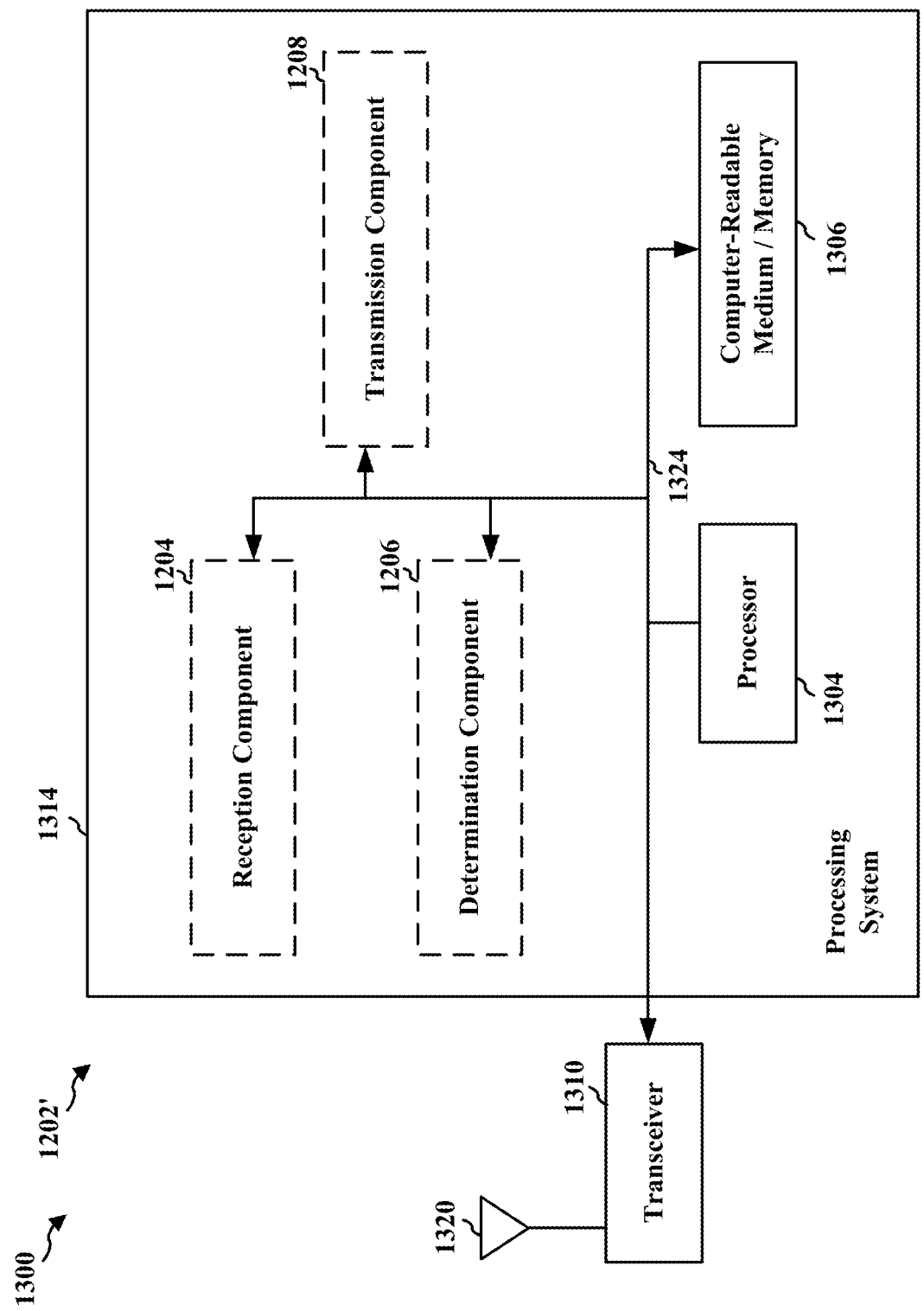
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1208, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described above for any particular apparatus. The computer-readable medium/memory 1306 may also be used for storing data that is manipulated by the processor 1304 when executing software. The processing system 1314 further includes at least one of the components 1204, 1206, 1208. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication may include means for transmitting, to a UE, first information associated with one or more resources allocated to the UE for at least one PRACH transmission. In one aspect, the one or more resources may be allocated in an unlicensed spectrum. In another aspect, the one or more resources may be allocated based on a multi-tone PRACH bandwidth. In certain aspects, the first information may indicate a tone spacing within the multi-tone PRACH bandwidth. In another configuration, the apparatus 1202/1202' for wireless communication may include means for transmitting second information associated with a frequency hopping configuration to the UE. In one aspect, the frequency hopping configuration may be associated with at least one of the one or more allocated resources or the multi-tone PRACH bandwidth. In a further configuration, the apparatus 1202/1202' for wireless communication may include means for transmitting third information associated with a PSD to the UE. In one aspect, the PSD may be associated with one or more physical channels. In another aspect, the third information may indicate if a PSD limit applies to the one or more physical channels. In a further aspect, the third information further indicates the PSD limit when the PSD limit applies to the one or more physical channels. In one aspect, the third information is received in a SIB on an anchor channel or frequency hopping channel. In one configuration, the apparatus 1202/1202' for wireless communication may include means for transmitting third information indicating one or more of a frame structure associated with the one or more resources allocated for the at least one PRACH transmission or indicating if a LBT procedure is performed before the UE transmits the at least one PRACH transmission. In one configuration, the apparatus 1202/1202' for wireless communication may include means for receiving, from the UE, the at least one PRACH transmission using the one or more allocated resources within the multi-tone PRACH bandwidth and the frequency hopping configuration. In another configuration, the apparatus 1202/1202' for wireless communication may include means for receiving the at least one PRACH transmission using the frequency hopping configuration by receiving a first set of PRACH transmissions using a first set of symbol groups located in a first set of adjacent tones. In one aspect, the means for receiving the at least one PRACH transmission using the frequency hopping configuration may be configured to receive a second set of PRACH transmissions using a second set of symbol groups located in a second set of adjacent tones. In one aspect, the second set of adjacent tones may be non-adjacent to the first set of adjacent tones. In another aspect, the first set of adjacent tones and the second set of adjacent tones may be located in a first portion of the unlicensed spectrum. In another aspect, the means for receiving the at least one PRACH transmission using the frequency hopping configuration may be configured to receive the at least one PRACH transmission using the frequency hopping configuration by receiving a third set of PRACH transmissions using a third set of symbol groups located in a third set of adjacent tones. In one aspect, the third set of adjacent tones may be located in a second portion of the unlicensed spectrum that is non-overlapping with the first portion of the unlicensed spectrum. In one aspect, the means for receiving the at least one PRACH transmission using the frequency hopping configuration may be configured to a first PRACH transmission using a first symbol group located in a first tone. In another aspect, the means for receiving the at least one PRACH transmission using the frequency hopping configuration may be configured to receive a second PRACH transmission using a second symbol group located in a second tone. In one aspect, the second tone may be non-adjacent to the first tone. In another aspect, the first tone and the second tone may be located in a first portion of the unlicensed spectrum. In a further aspect, the means for receiving the at least one PRACH transmission using the frequency hopping configuration may be configured to receive a third PRACH transmission using a third symbol group located in a third tone. In one aspect, the third tone may be located in a second portion of the unlicensed spectrum that is non-overlapping with the first portion of the unlicensed spectrum. In a further configuration, the apparatus 1202/1202' for wireless communication may include means for determining that a first transmission of the at least one PRACH transmission was transmitted using the PSD limit and was not properly received. In one configuration, the apparatus 1202/1202' for wireless communication may include means for transmitting signaling that either configures the UE to increase the number of repetitions for a retransmission of the first transmission, or configures the UE to increase a bandwidth used to transmit the retransmission of the first transmission.

The aforementioned means may be one or more of the aforementioned components of the apparatus 1202 and/or the processing system 1314 of the apparatus 1202' configured to perform the functions recited by the aforementioned means. As described above, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   receiving, from a base station, first information associated with one or more resources allocated for at least one physical random access channel (PRACH) transmission, the one or more resources being allocated in an unlicensed spectrum, and the one or more resources being allocated based on a multi-tone PRACH bandwidth;
   receiving second information associated with a frequency hopping configuration from the base station, the frequency hopping configuration being associated with at least one of the one or more allocated resources or the multi-tone PRACH bandwidth, and wherein the frequency hopping configuration includes a first set of symbol groups hopping in a first set of adjacent tones and a second set of symbol groups hopping in a second set of adjacent tones, the second set of adjacent tones being non-adjacent to the first set of adjacent tones;
   receiving, from the base station, third information indicating a power spectral density (PSD) limit that applies one or more physical channels; and
   transmitting, to the base station, the at least one PRACH transmission based on the PSD limit and using the one or more allocated resources within the multi-tone PRACH bandwidth and the frequency hopping configuration.

2. The method of claim 1, wherein the third information further indicates the PSD limit when the PSD limit applies to the one or more physical channels.

3. The method of claim 1, wherein the third information is received in a system information block (SIB) on an anchor channel or a frequency hopping channel.

4. The method of claim 1, further comprising:
   determining that a first transmission of the at least one PRACH transmission was transmitted using the PSD limit and was not properly received by the base station; and
   increasing a number of repetitions for a retransmission of the first transmission or increasing a bandwidth used to transmit the retransmission of the first transmission in response to determining that the first transmission that was transmitted using the PSD limit was not properly received by the base station.

5. The method of claim 4, further comprising:
   receiving signaling from the base station that either
   configures the UE to increase the number of repetitions for the retransmission of the first transmission, or
   configures the UE to increase a bandwidth used to transmit the retransmission of the first transmission; and
   retransmitting the first transmission with either an increased number of repetitions or an increased bandwidth.

6. The method of claim 1, wherein the transmitting the at least one PRACH transmission using the frequency hopping configuration comprises:
   transmitting a first set of PRACH transmissions using the first set of symbol groups located in the first set of adjacent tones; and
   transmitting a second set of PRACH transmissions using the second set of symbol groups located in the second set of adjacent tones, the second set of adjacent tones being non-adjacent to the first set of adjacent tones.

7. The method of claim 6, wherein the first set of adjacent tones and the second set of adjacent tones are located in a first portion of the unlicensed spectrum and the transmitting the at least one PRACH transmission using the frequency hopping configuration further comprises:
   transmitting a third set of PRACH transmissions using a third set of symbol groups located in a third set of adjacent tones, the third set of adjacent tones being located in a second portion of the unlicensed spectrum that is non-overlapping with the first portion of the unlicensed spectrum.

8. The method of claim 7, wherein:
   the transmitting the first set of PRACH transmissions in the first set of adjacent tones comprises first level frequency hopping;
   the transmitting the second set of PRACH transmissions in the second set of adjacent tones that are non-adjacent to the first set of adjacent tones comprises second level frequency hopping; and
   the transmitting the third set of PRACH transmissions in the third set of adjacent tones that are in the second portion of the unlicensed spectrum that is non-overlapping with the first portion of the unlicensed spectrum comprises third level frequency hopping.

9. The method of claim 8, wherein the third level frequency hopping is based on base station frequency hopping in which the base station switches a carrier among different narrowband frequency channels, and wherein the first level frequency hopping and the second level frequency hopping are performed within a corresponding portion of the unlicensed spectrum based on the third level frequency hopping.

10. The method of claim 7, wherein the UE hops from the first portion of the unlicensed spectrum to the second portion of the unlicensed spectrum for the transmission of the third set of PRACH transmissions based on base station frequency hopping in which the base station switches a carrier among different narrowband frequency channels.

11. The method of claim 1, wherein the transmitting the at least one PRACH transmission using the frequency hopping configuration comprises:
transmitting a first PRACH transmission using a first symbol group located in a first tone; and
transmitting a second PRACH transmission using a second symbol group located in a second tone, the second tone being non-adjacent to the first tone.

12. The method of claim 11, wherein the first tone and the second tone are located in a first portion of the unlicensed spectrum and the transmitting the at least one PRACH transmission using the frequency hopping configuration further comprises:
transmitting a third PRACH transmission using a third symbol group located in a third tone, the third tone being located in a second portion of the unlicensed spectrum that is non-overlapping with the first portion of the unlicensed spectrum.

13. The method of claim 12, wherein:
the transmitting the second PRACH transmission in the second tone that is non-adjacent to the first tone comprises second level frequency hopping; and
the transmitting the third PRACH transmission in the third tone that is in the second portion of the unlicensed spectrum that is non-overlapping with the first portion of the unlicensed spectrum comprises third level frequency hopping.

14. The method of claim 1, further comprising:
receiving third information indicating one or more of a frame structure associated with the one or more resources allocated for the at least one PRACH transmission or indicating that a listen-before-talk (LBT) procedure is performed before transmitting the at least one PRACH transmission; and
performing the LBT procedure when the third information indicates that the LBT procedure is performed before the transmitting the at least one PRACH transmission.

15. The method of claim 1, further comprising:
determining at least one of the one or more resources for transmitting the at least one PRACH transmission, the at least one of the one or more resources determined based on a bandwidth capability of the UE.

16. The method of claim 1, wherein the first information indicates a tone spacing within the multi-tone PRACH bandwidth.

17. The method of claim 1, wherein the first information and the second information are received in a master information block (MIB) or a system information block (SIB).

18. A method of wireless communication for a base station, comprising:
transmitting, to a user equipment (UE), first information associated with one or more resources allocated to the UE for at least one physical random access channel (PRACH) transmission, the one or more resources being allocated in an unlicensed spectrum, and the one or more resources being allocated based on a multi-tone PRACH bandwidth;
transmitting second information associated with a frequency hopping configuration to the UE, the frequency hopping configuration being associated with at least one of the one or more allocated resources or the multi-tone PRACH bandwidth, and wherein the frequency hopping configuration includes a first set of symbol groups hopping in a first set of adjacent tones and a second set of symbol groups hopping in a second set of adjacent tones, the second set of adjacent tones being non-adjacent to the first set of adjacent tones;
transmitting, to the UE, third information indicating a power spectral density (PSD) limit that applies one or more physical channels; and
receiving, from the UE, the at least one PRACH transmission based on the PSD limit and using the one or more allocated resources within the multi-tone PRACH bandwidth and the frequency hopping configuration.

19. The method of claim 18, wherein the third information further indicates the PSD limit when the PSD limit applies to the one or more physical channels.

20. The method of claim 18, wherein the third information is transmitted in a system information block (SIB) on an anchor channel or a frequency hopping channel.

21. The method of claim 18, further comprising:
determining that a first transmission of the at least one PRACH transmission was transmitted using the PSD limit and was not properly received; and
transmitting signaling that either
configures the UE to increase the number of repetitions for a retransmission of the first transmission, or
configures the UE to increase a bandwidth used to transmit the retransmission of the first transmission.

22. The method of claim 21, further comprising:
receiving a retransmission of the first transmission with either an increased number of repetitions or an increased bandwidth from the UE.

23. The method of claim 18, wherein the receiving the at least one PRACH transmission using the frequency hopping configuration comprises:
receiving a first set of PRACH transmissions using the first set of symbol groups located in the first set of adjacent tones; and
receiving a second set of PRACH transmissions using the second set of symbol groups located in the second set or adjacent tones, the second set of adjacent tones being non-adjacent to the first set of adjacent tones.

24. The method of claim 23, wherein the first set of adjacent tones and the second set of adjacent tones are located in a first portion of the unlicensed spectrum and the receiving the at least one PRACH transmission using the frequency hopping configuration further comprises:
receiving a third set of PRACH transmissions using a third set of symbol groups located in a third set of adjacent tones, the third set of adjacent tones being located in a second portion of the unlicensed spectrum that is non-overlapping with the first portion of the unlicensed spectrum.

25. The method of claim 18, wherein the receiving the at least one PRACH transmission using the frequency hopping configuration comprises:
receiving a first PRACH transmission using a first symbol group located in a first tone; and
receiving a second PRACH transmission using a second symbol group located in a second tone, the second tone being non-adjacent to the first tone.

26. The method of claim 25, wherein the first tone and the second tone are located in a first portion of the unlicensed spectrum and the receiving the at least one PRACH transmission using the frequency hopping configuration further comprises:

receiving a third PRACH transmission using a third symbol group located in a third tone, the third tone being located in a second portion of the unlicensed spectrum that is non-overlapping with the first portion of the unlicensed spectrum.

27. The method of claim 18, further comprising:
transmitting third information indicating one or more of a frame structure associated with the one or more resources allocated for the at least one PRACH transmission or indicating that a listen-before-talk (LBT) procedure is performed before the LIE transmits the at least one PRACH transmission.

28. An apparatus for wireless communication for a user equipment (UE), comprising:
a memory; and
at least one processor coupled to the memory and configured to:
  receive, from a base station, first information associated with one or more resources allocated for at least one physical random access channel (PRACH) transmission, the one or more resources being allocated in an unlicensed spectrum, and the one or more resources being allocated based on a multi-tone PRACH bandwidth;
  receive second information associated with a frequency hopping configuration from the base station, the frequency hopping configuration being associated with at least one of the one or more allocated resources or the multi-tone PRACH bandwidth, and wherein the frequency hopping configuration includes a first set of symbol groups hopping in a first set of adjacent tones and a second set of symbol groups hopping in a second set of adjacent tones, the second set of adjacent tones being non-adjacent to the first set of adjacent tones;
  receive, from the base station, third information indicating a power spectral density (PSD) limit that applies one or more physical Channels; and
  transmit, to the base station, the at least one PRACH transmission based on the PSD limit and using the one or more allocated resources within the multi-tone PRACH bandwidth and the frequency hopping configuration.

29. An apparatus for wireless communication for a base station, comprising:
a memory; and
at least one processor coupled to the memory and configured to:
  transmit, to a user equipment (UE), first information associated with one or more resources allocated to the UE for at least one physical random access channel (PRACH) transmission, the one or more resources being allocated in an unlicensed spectrum, and the one or more resources being allocated based on a multi-tone PRACH bandwidth;
  transmit second information associated with a frequency hopping configuration to the UE, the frequency hopping configuration being associated with at least one of the one or more allocated resources or the multi-tone PRACH bandwidth, and wherein the frequency hopping configuration includes a first set of symbol groups hopping in a first set of adjacent tones and a second set of symbol groups hopping in a second set of adjacent tones, the second set of adjacent tones being non-adjacent to the first set of adjacent tones;
  transmitting, to the UE, third information indicating a power spectral density (PSD) limit that applies one or more physical channels; and
  receive, from the UE, the at least one PRACH transmission based on the PSD limit and using the one or more allocated resources within the multi-tone PRACH bandwidth and the frequency hopping configuration.

30. A method of wireless communication for a user equipment (UE), comprising:
receiving, from a base station, first information associated with one or more resources allocated for at least one physical random access channel (PRACH) transmission, the one or more resources being allocated in an unlicensed spectrum, and the one or more resources being allocated based on a multi-tone PRACH bandwidth;
receiving second information associated with a frequency hopping configuration from the base station, the frequency hopping configuration being associated with at least one of the one or more allocated resources or the multi-tone PRACH bandwidth, and wherein the frequency hopping configuration includes a first set of symbol groups hopping in a first set of adjacent tones and a second set of symbol groups hopping in a second set of adjacent tones, the second set of adjacent tones being non-adjacent to the first set of adjacent tones, wherein the first information and the second information are received in a master information block (MIB) or a system information block (SIB);
receiving, from the base station, third information indicating a power spectral density (PSD) limit that applies one or more physical channels;
transmitting, to the base station, the at least one PRACH transmission based on the PSD limit and using the one or more allocated resources within the multi-tone PRACH bandwidth and the frequency hopping configuration;
determining that a first transmission of the at least one PRACH transmission was transmitted using the PSD limit and was not properly received by the base station; and
increasing a number of repetitions for a retransmission of the first transmission or increasing a bandwidth used to transmit the retransmission of the first transmission in response to determining that the first transmission that was transmitted using the PSD limit was not properly received by the base station.

* * * * *